US012576614B2

(12) United States Patent

Hunt et al.

(10) Patent No.: US 12,576,614 B2

(45) Date of Patent: Mar. 17, 2026

(54) POROUS METAL COUPON WITH THERMAL TRANSFER STRUCTURE FOR COMPONENT AND RELATED COMPONENT

(71) Applicant: GE Infrastructure Technology LLC, Greenville, SC (US)

(72) Inventors: Mark Lawrence Hunt, Greenville, SC (US); Nathan Nicholas Ostrout, Greenville, SC (US); Jacob Andrew Salm, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 228 days.

(21) Appl. No.: 18/495,810

(22) Filed: Oct. 27, 2023

(65) Prior Publication Data

US 2025/0135750 A1 May 1, 2025

(51) Int. Cl.
B32B 15/01 (2006.01)
F01D 5/00 (2006.01)

(52) U.S. Cl.
CPC .................................... B32B 15/01 (2013.01)

(58) Field of Classification Search
None
See application file for complete search history.

(56) References Cited

U.S. PATENT DOCUMENTS

| | | | |
|---|---|---|---|
| 653,280 A | 7/1900 | Barthels et al. | |
| 3,031,996 A | 5/1962 | Botvin | |
| 4,195,764 A | * | 4/1980 | Bogart ...................... B22F 7/06 228/208 |
| 5,156,321 A | 10/1992 | Liburdi et al. | |

(Continued)

FOREIGN PATENT DOCUMENTS

| | | |
|---|---|---|
| CN | 113430414 A | 9/2021 |
| DE | 10 2018 218017 A1 | 4/2020 |

(Continued)

OTHER PUBLICATIONS

Non-Final Office Action dated Apr. 21, 2025 for related U.S. Appl. No. 18/495,816, 29 pages.

(Continued)

*Primary Examiner* — Mary I Omori

(74) *Attorney, Agent, or Firm* — James Pemrick; Charlotte Wilson; Hoffman Warnick LLC

(57) ABSTRACT

A component includes a body and an additively manufactured (AM) metal coupon that includes a primary member having a member porosity between 2% to 50% open space volume to total volume of the primary member. The primary member includes a first portion and a second portion distanced from the first portion by a gap. At least one thermal transfer structure, such as pin(s) and/or fin(s), extends between the first and second portions across the gap. A braze material couples the AM metal coupon in a coupon opening in the body, and infiltrates into the primary member based at least on a characteristic of the member porosity. The braze material may also infiltrate the thermal transfer structure(s), which may have the same or different porosity from the primary member. The thermal transfer structure(s) exhibit enhanced heat rejection, reduce weight of the component, and may improve component vibratory response.

12 Claims, 19 Drawing Sheets

(56) References Cited

U.S. PATENT DOCUMENTS

| | | | |
|---|---|---|---|
| 5,775,402 | A | 7/1998 | Sachs et al. |
| 6,199,746 | B1 | 3/2001 | Dupree et al. |
| 6,413,650 | B1 | 7/2002 | Dupree et al. |
| 7,635,078 | B2 | 12/2009 | Ariga et al. |
| 8,042,723 | B2 | 10/2011 | Holi |
| 9,873,171 | B2 | 1/2018 | Li et al. |
| 10,228,138 | B2 | 3/2019 | Theuer et al. |
| 10,384,787 | B2 | 8/2019 | Gordon et al. |
| 10,456,849 | B2 | 10/2019 | Eminoglu |
| 10,767,489 | B2 | 9/2020 | Bunker |
| 10,975,719 | B2 | 4/2021 | Ucok et al. |
| 11,001,002 | B2 | 5/2021 | Kulinsky |
| 11,577,317 | B2 | 2/2023 | Hart et al. |
| 11,712,738 | B2 | 8/2023 | Ozbaysal et al. |
| 2007/0084047 | A1 | 4/2007 | Lange et al. |
| 2009/0229101 | A1 | 9/2009 | Ahmad |
| 2010/0239412 | A1 | 9/2010 | Draper |
| 2011/0099810 | A1 | 5/2011 | Stankowski et al. |
| 2012/0003086 | A1 | 1/2012 | Morris et al. |
| 2013/0086785 | A1 | 4/2013 | Cui et al. |
| 2013/0104397 | A1 | 5/2013 | Bunker |
| 2014/0020823 | A1 | 1/2014 | Montross |
| 2014/0111956 | A1 | 4/2014 | Taniguchi |
| 2014/0259666 | A1 | 9/2014 | Baughman et al. |
| 2014/0321994 | A1 | 10/2014 | Brzek |
| 2015/0093566 | A1 | 4/2015 | Bell |
| 2015/0147164 | A1 | 5/2015 | Cui et al. |
| 2015/0283642 | A1 | 10/2015 | Forsdike et al. |
| 2016/0059364 | A1 | 3/2016 | Huxol |
| 2016/0090848 | A1 | 3/2016 | Engeli et al. |
| 2016/0115571 | A1 | 4/2016 | Kestler et al. |
| 2016/0214176 | A1 | 7/2016 | Bruck et al. |
| 2016/0325368 | A1 | 11/2016 | Landwehr et al. |
| 2017/0284206 | A1 | 10/2017 | Roberts |
| 2017/0328207 | A1 | 11/2017 | Bunker |
| 2018/0010457 | A1 | 1/2018 | Chabane et al. |
| 2018/0010458 | A1* | 1/2018 | Chabane ............... B33Y 80/00 |
| 2018/0023403 | A1* | 1/2018 | Jones ..................... F01D 5/141 |
| | | | 415/115 |
| 2018/0161902 | A1 | 6/2018 | Cui et al. |
| 2018/0180329 | A9 | 6/2018 | Conrad et al. |
| 2018/0187564 | A1 | 7/2018 | Cui et al. |
| 2018/0200817 | A1 | 7/2018 | Henderson et al. |
| 2018/0320270 | A1 | 11/2018 | Nardi |
| 2018/0339354 | A1 | 11/2018 | Eminoglu et al. |
| 2018/0345415 | A1 | 12/2018 | Whims |
| 2019/0054567 | A1 | 2/2019 | Roerig et al. |
| 2019/0284942 | A1 | 9/2019 | Tanigawa et al. |
| 2019/0329344 | A1 | 10/2019 | Eminoglu et al. |
| 2019/0345826 | A1 | 11/2019 | Packer et al. |
| 2020/0047253 | A1 | 2/2020 | Thomas et al. |
| 2020/0072078 | A1 | 3/2020 | Decesare et al. |
| 2020/0149403 | A1* | 5/2020 | Kottilingam ............ F01D 5/187 |
| 2020/0254548 | A1 | 8/2020 | Xu et al. |
| 2020/0384560 | A1 | 12/2020 | Rebbecchi, Jr. et al. |
| 2021/0114110 | A1 | 4/2021 | Sercombe et al. |
| 2021/0146459 | A1 | 5/2021 | Gold et al. |
| 2021/0146485 | A1 | 5/2021 | Bulgrin et al. |
| 2021/0154956 | A1 | 5/2021 | Schubel et al. |
| 2022/0136395 | A1 | 5/2022 | Ozbaysal et al. |
| 2022/0234101 | A1 | 7/2022 | Ozbaysal et al. |
| 2022/0402031 | A1 | 12/2022 | Hann et al. |
| 2023/0145370 | A1* | 5/2023 | Dyson ..................... F01D 5/147 |
| 2025/0135588 | A1 | 5/2025 | Salm et al. |

FOREIGN PATENT DOCUMENTS

| | | | |
|---|---|---|---|
| EP | 1074331 | A1 | 2/2001 |
| EP | 2450471 | A1 | 5/2012 |
| EP | 3360637 | A1 | 8/2018 |
| EP | 3508686 | A1 | 7/2019 |
| EP | 3693115 | A1 | 8/2020 |
| TW | I670166 | B | 9/2019 |
| WO | 2020014677 | A1 | 1/2020 |
| WO | 2020145971 | A1 | 7/2020 |
| WO | 2021247970 | A1 | 12/2021 |

OTHER PUBLICATIONS

EP Search Report for EP Application No. 24204157.2, dated Mar. 14, 2025, 11 pages.

EP Search Report for EP Application No. 24204160.6, dated Apr. 16, 2025, 12 pages.

EP Search Report for EP Application No. 24204462.6, dated Apr. 1, 2025, 10 pages.

EP Search Report for EP Application No. 24204155.6, dated Apr. 2, 2025, 10 pages.

EP Search Report for EP Application No. 24204158.0, dated Mar. 19, 2025, 10 pages.

EP Search Report for EP Application No. 24204153.1, dated Mar. 3, 2025, 11 pages.

EP Search Report for EP Application No. 24204463.4, dated Apr. 22, 2025, 10 pages.

EP Search Report for EP Application No. 24204461.8, dated Mar. 14, 2025, 11 pages.

EP Search Report for EP Application No. 24204154.9, dated Mar. 19, 2025, 13 pages.

EP Search Report for EP Application No. 24204161.4, dated Mar. 14, 2025, 14 pages.

EP Search Report for EP Application No. 24204156.4, dated Mar. 18, 2025, 13 pages.

Non-Final Office Action issued in U.S. Appl. No. 18/495,803, dated Nov. 14, 2024, 26 pages.

Non-Final Office Action dated May 9, 2025 for related U.S. Appl. No. 18/495,808, 16 pages.

EP Search Report for EP Application No. 24204162.2, dated Mar. 14, 2025, 11 pages.

Final Office Action for related U.S. Appl. No. 18/495,803, dated Mar. 19, 2025, 26 pages.

Office Action (Final Rejection) dated Sep. 26, 2025 for related U.S. Appl. No. 18/495,808, 17 pages.

Office Action (Non-Final Rejection) dated Jul. 28, 2025 for related U.S. Appl. No. 18/417,625, 16 pages.

Office Action (Final Rejection) dated Aug. 8, 2025 for related U.S. Appl. No. 18/495,816, 15 pages.

Notice of Allowance and Fees Due dated Aug. 5, 2025 for related U.S. Appl. No. 18/495,817, 9 pages.

Office Action (Non-Final Rejection) dated Aug. 11, 2025 for related U.S. Appl. No. 18/495,809, 13 pages.

EP Search Report for EP Application No. 24223562.0, dated Jul. 8, 2025, 7 pages.

Office Action (Non-Final Rejection) dated Sep. 4, 2025 for U.S. Appl. No. 18/495,818 (pp. 1-13).

* cited by examiner

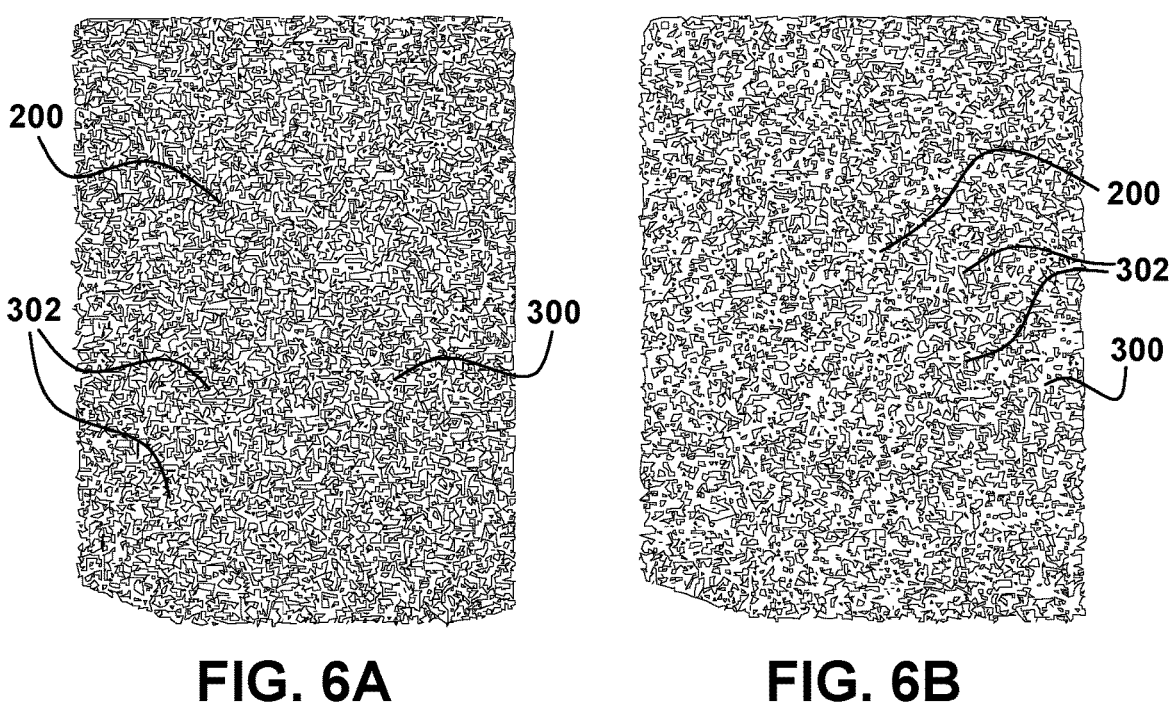
FIG. 6A                    FIG. 6B
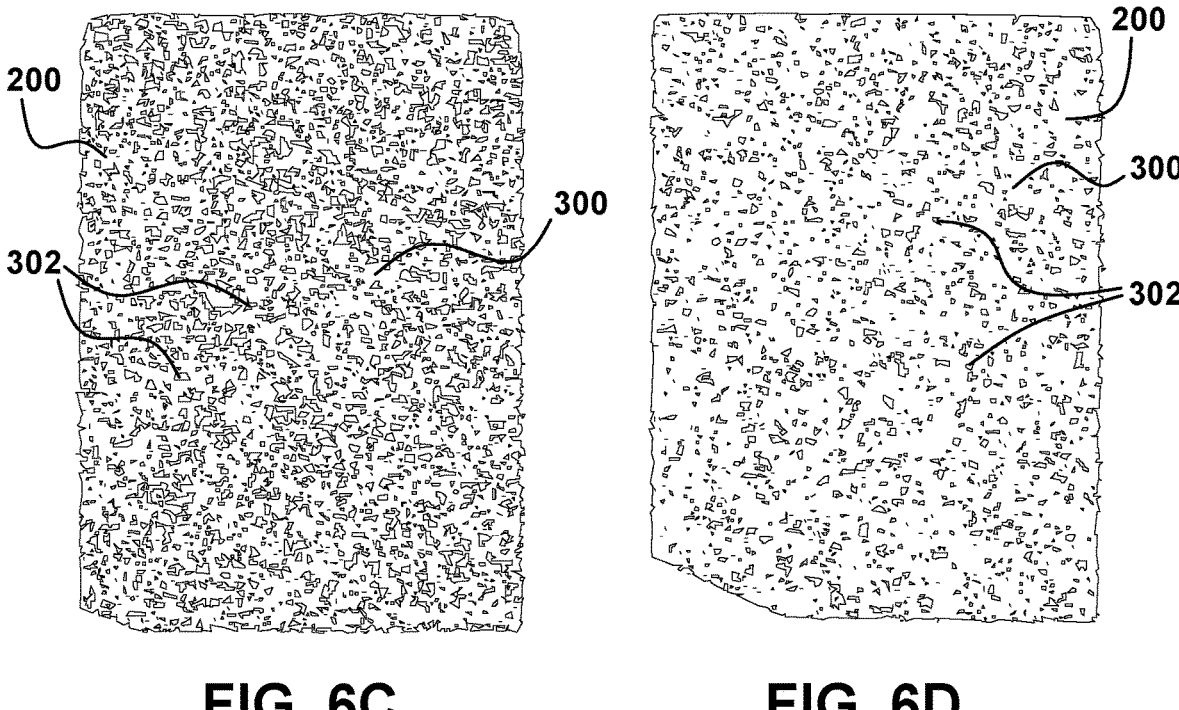
FIG. 6C                    FIG. 6D

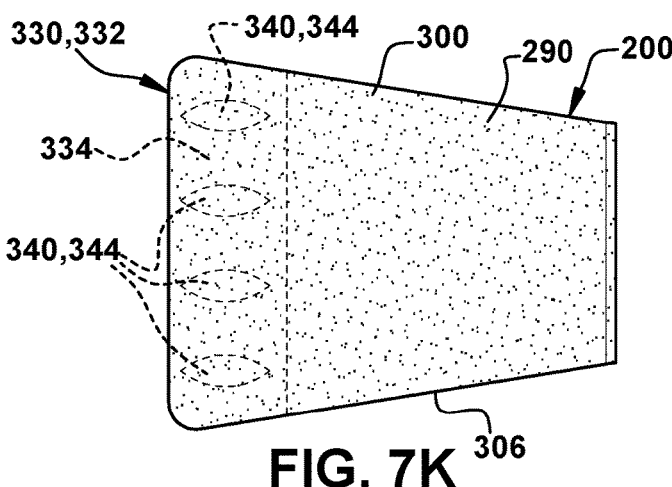
FIG. 7K
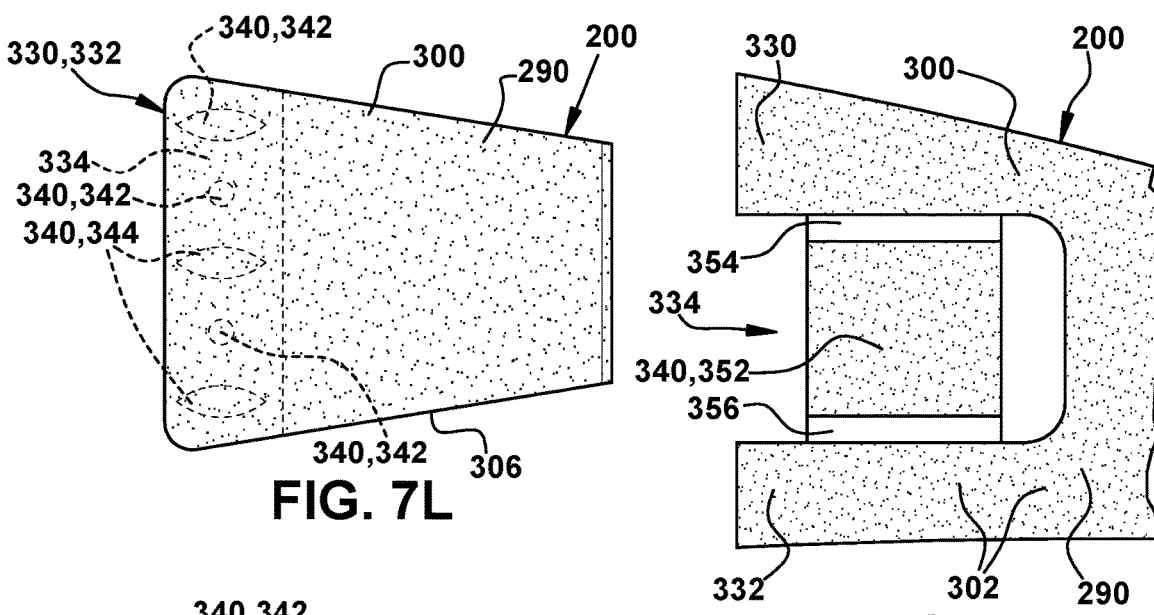
FIG. 7L
FIG. 7N
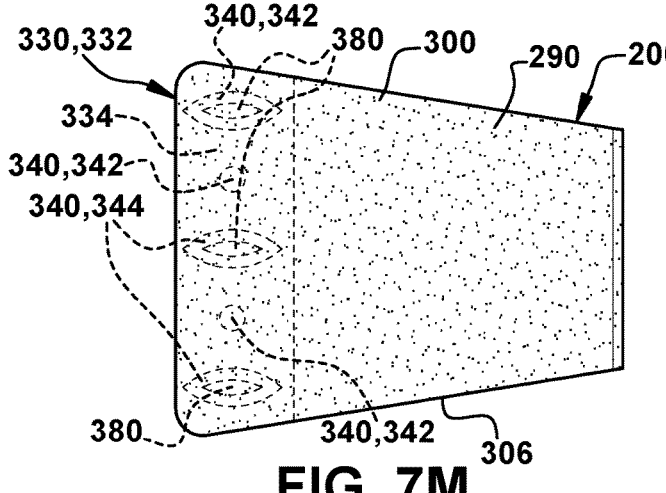
FIG. 7M

POROUS METAL COUPON WITH THERMAL TRANSFER STRUCTURE FOR COMPONENT AND RELATED COMPONENT

TECHNICAL FIELD

The disclosure relates generally to component repair or manufacture, and more specifically, to component using a porous metal coupon with at least one thermal transfer structure.

BACKGROUND

Industrial components occasionally require repair. For example, hot gas path components that are used in turbomachines to direct a working fluid to create energy may require repair. Hot gas path components can take a variety of forms, such as turbine rotor blades or stationary vanes, that include airfoils that direct a working fluid to create energy. Rotor blades are coupled to and act to turn a turbine rotor, and stationary vanes are coupled to a casing of the turbomachine to direct the working fluid towards the rotor blades.

Additive manufacturing such as direct metal laser melting (DMLM) or selective laser melting (SLM) has emerged as a reliable manufacturing method for making industrial components. The advent of additive manufacturing techniques has also provided the ability to replace sections of components such as part of a leading or trailing edge of a turbomachine nozzle. For example, a portion of a leading edge of a turbomachine nozzle may be removed, leaving a cutout in the nozzle, and a new section (referred to herein as a "coupon") may be coupled in the cutout. The coupon is additively manufactured to have a shape that at least generally matches that of the cutout. The coupon can replace a section of a used turbomachine nozzle or be added as part of a new turbomachine nozzle.

However, replacement coupons are made with the same materials and exterior structure as the removed portion of the component. Consequently, the replacement coupons suffer from some of the same drawbacks as the original component and/or cutout with no improvement to general performance characteristics such as coupon strength, oxidation resistance, cycle fatigue, stress/strain resistance, ductility, wear resistance, thermal or electrical conductivity, and/or decreased mass. A single braze material is used to couple the replacement coupon to the component, which prevents improving the general performance characteristics listed above and additional performance characteristics related to the joint, such as increasing joint adhesive bond strength and reliability, and decreasing required post-braze machining/blending. Using coupons that are materially identical to the removed cutouts also does not allow reduction in the high material cost for the replacement coupons.

BRIEF DESCRIPTION

All aspects, examples and features mentioned below can be combined in any technically possible way.

An aspect of the disclosure provides an additively manufactured (AM) metal coupon for insertion in a component, the AM metal coupon comprising: a primary member having a member porosity between 2% to 50% open space volume to total volume of the primary member, wherein the primary member has a first portion distanced from a second portion by a gap; and at least one thermal transfer structure extending between the first portion and the second portion across the gap.

Another aspect of the disclosure includes any of the preceding aspects, and the at least one thermal transfer structure includes at least one of a pin or a fin extending between the first portion and the second portion across the gap.

Another aspect of the disclosure includes any of the preceding aspects, and the at least one thermal transfer structure includes a plurality of the at least one of the pin and the fin extending between the first portion and the second portion across the gap.

Another aspect of the disclosure includes any of the preceding aspects, and the at least one thermal transfer structure has the member porosity.

Another aspect of the disclosure includes any of the preceding aspects, and further comprising a braze material infiltration barrier encapsulating a side of the at least one thermal transfer structure, wherein a center of the at least one thermal transfer structure has the member porosity.

Another aspect of the disclosure includes any of the preceding aspects, and the at least one thermal transfer structure has a thermal transfer (TT) structure porosity different than the member porosity.

Another aspect of the disclosure includes any of the preceding aspects, and the TT structure porosity is between 2% to 50% open space volume to total volume of the at least one thermal transfer structure.

Another aspect of the disclosure includes any of the preceding aspects, and further comprising a braze material infiltration barrier encapsulating a side of the at least one thermal transfer structure, wherein a center of the at least one thermal transfer structure has the TT structure porosity.

Another aspect of the disclosure includes any of the preceding aspects, and the at least one thermal transfer structure is solid.

Another aspect of the disclosure includes any of the preceding aspects, and the at least one thermal transfer structure is hollow.

Another aspect of the disclosure includes any of the preceding aspects, and further comprising a cooling passage extending through at least part of the primary member and having a first end open to the gap and a second end extending through an exterior surface of the primary member.

An aspect of the disclosure includes a component, comprising: a body; an additively manufactured (AM) metal coupon including: a primary member having a member porosity between 2% to 50% open space volume to total volume of the primary member, wherein the primary member has a first portion distanced from a second portion by a gap; and at least one thermal transfer structure extending between the first portion and the second portion across the gap; and a braze material coupling the AM metal coupon in a coupon opening in the body, the braze material infiltrated into the primary member based at least on a characteristic of the member porosity.

Another aspect of the disclosure includes any of the preceding aspects, and the at least one thermal transfer structure includes at least one of a pin or a fin extending between the first portion and the second portion across the gap.

Another aspect of the disclosure includes any of the preceding aspects, and the at least one thermal transfer structure includes a plurality of the at least one of the pin and the fin extending between the first portion and the second portion across the gap.

Another aspect of the disclosure includes any of the preceding aspects, and the at least one thermal transfer structure has the member porosity, wherein the braze material infiltrates at least partially into the at least one thermal transfer structure.

Another aspect of the disclosure includes any of the preceding aspects, and further comprising a braze material infiltration barrier encapsulating a side of the at least one thermal transfer structure, wherein a center of the at least one thermal transfer structure has the member porosity, and the braze material infiltrates at least partially into the at least one thermal transfer structure.

Another aspect of the disclosure includes any of the preceding aspects, and the at least one thermal transfer structure has a thermal transfer (TT) structure porosity different than the member porosity.

Another aspect of the disclosure includes any of the preceding aspects, and the TT structure porosity is between 2% to 50% open space volume to total volume of the at least one thermal transfer structure, wherein the braze material infiltrates at least partially into the at least one thermal transfer structure based at least on a characteristic of the TT structure porosity.

Another aspect of the disclosure includes any of the preceding aspects, and further comprising a braze material infiltration barrier encapsulating a side of the at least one thermal transfer structure.

Another aspect of the disclosure includes any of the preceding aspects, and the at least one thermal transfer structure is solid.

Another aspect of the disclosure includes any of the preceding aspects, and the at least one thermal transfer structure is hollow.

Another aspect of the disclosure includes any of the preceding aspects, and further comprising a cooling passage extending through at least part of the primary member and having a first end open to the gap and a second end extending through an exterior surface of the primary member.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 6A-D show top-down views of sample metal coupons having porous regions having different porosities according to embodiments of the disclosure;

Figure 1:
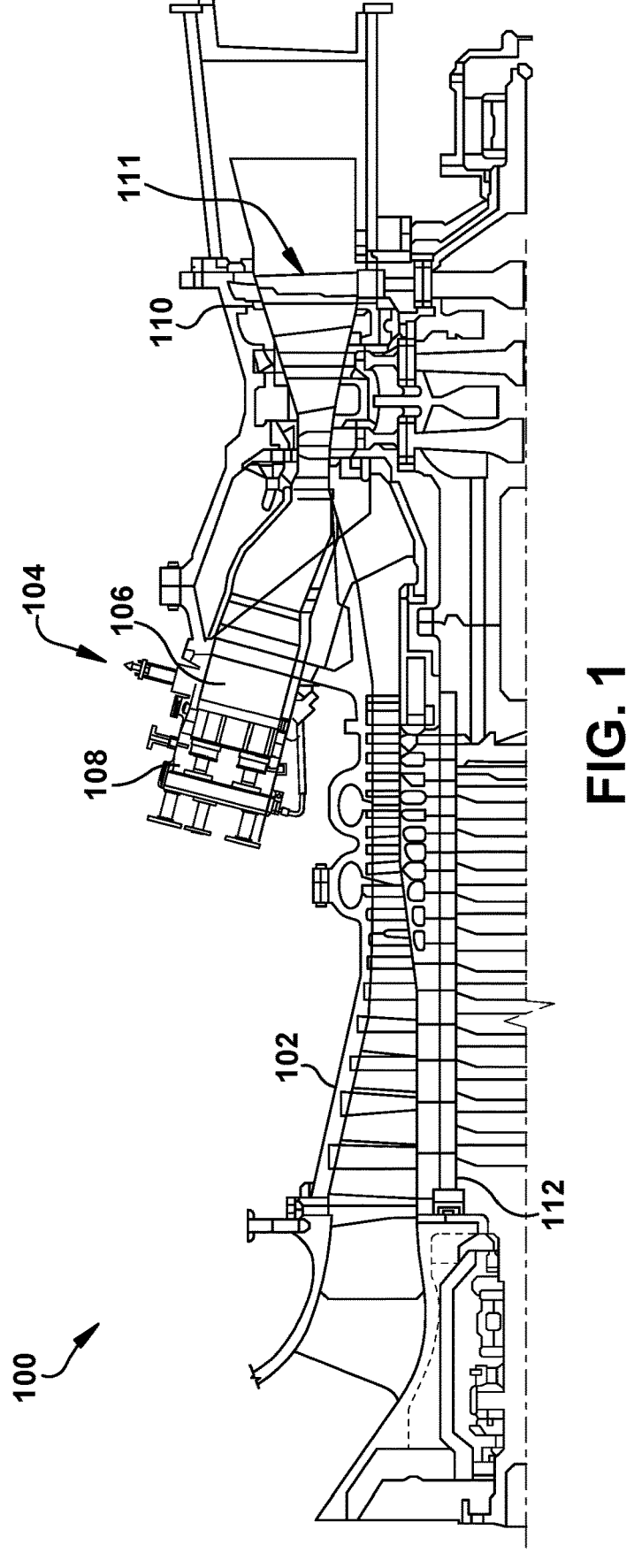
FIG. 1 shows a schematic view of an illustrative industrial machine in the form of a gas turbine system and including a component according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a component including a body and an additively manufactured (AM) metal coupon that includes a primary member having a member porosity between 2% to 50% open space volume to total volume of the primary member. The primary member has a first portion distanced from a second portion by a gap. At least one thermal transfer structure, such as pin(s) and/or fin(s), extends between the first portion and the second portion across the gap. A braze material couples the AM metal coupon in a coupon opening in the body, and infiltrates into the primary member based at least on a characteristic of the member porosity. The braze material may also infiltrate the thermal transfer structure(s), which may have the same or different porosity from the primary member. A porous AM coupon can be fabricated with any variety of thermal transfer structures that can potentially be filled with one or more braze materials during a brazing infiltration step. The thermal transfer structure(s) exhibit enhanced heat rejection, reduce weight of the component, and may improve component vibratory response. The one or more porosities of the AM metal coupon are configured to direct the flow of one or more braze materials in different ways to create different physical characteristics than previously possible, e.g., by directing more braze material where needed, directing braze material into special shapes and/or allowing use of more than one braze material. Where used for repair, the customized AM metal coupons do not suffer the same drawbacks as the original component and/or cutout and can be customized (with the braze material(s)) to, for example, change: joint adhesive bond strength, coupon strength, stress/strain resistance, ductility, wear resistance, oxidation resistance, cycle fatigue, thermal conductivity, electrical conductivity, surface roughness, hardness, and/or mass. The repair is stronger than traditional narrow gap brazing processes, does not require certain post-repair finishing, yet provides improved physical characteristics compared to current techniques, such as pre-sintered preforms (PSPs). One or more braze materials can be used to couple the replacement coupon to the component to also improve performance characteristics related to the joint, such as joint adhesive bond strength and reliability, and reduce post-brazing machining/blending. Use of the porous AM coupon can also reduce material costs, for example, by using less of the metal coupon's more expensive base material.

FIG. 1 shows a schematic illustration of an illustrative industrial machine, which may include a component according to teachings of the disclosure. In the example, the machine includes a turbomachine 100 in the form of a combustion or gas turbine (GT) system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft or rotor 112. In one embodiment, turbomachine 100 is a 7HA.03 engine, commercially available from GE Vernova. The present disclosure is not limited to any one particular GT system and may be implemented in connection with other engines including, for example, the other HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc. Moreover, the present disclosure is not limited to any particular turbomachine component and may be applicable to any industrial component that employs coupons during manufacture or repair.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there are a plurality of combustors and fuel nozzle assemblies 108.

Figure 2:
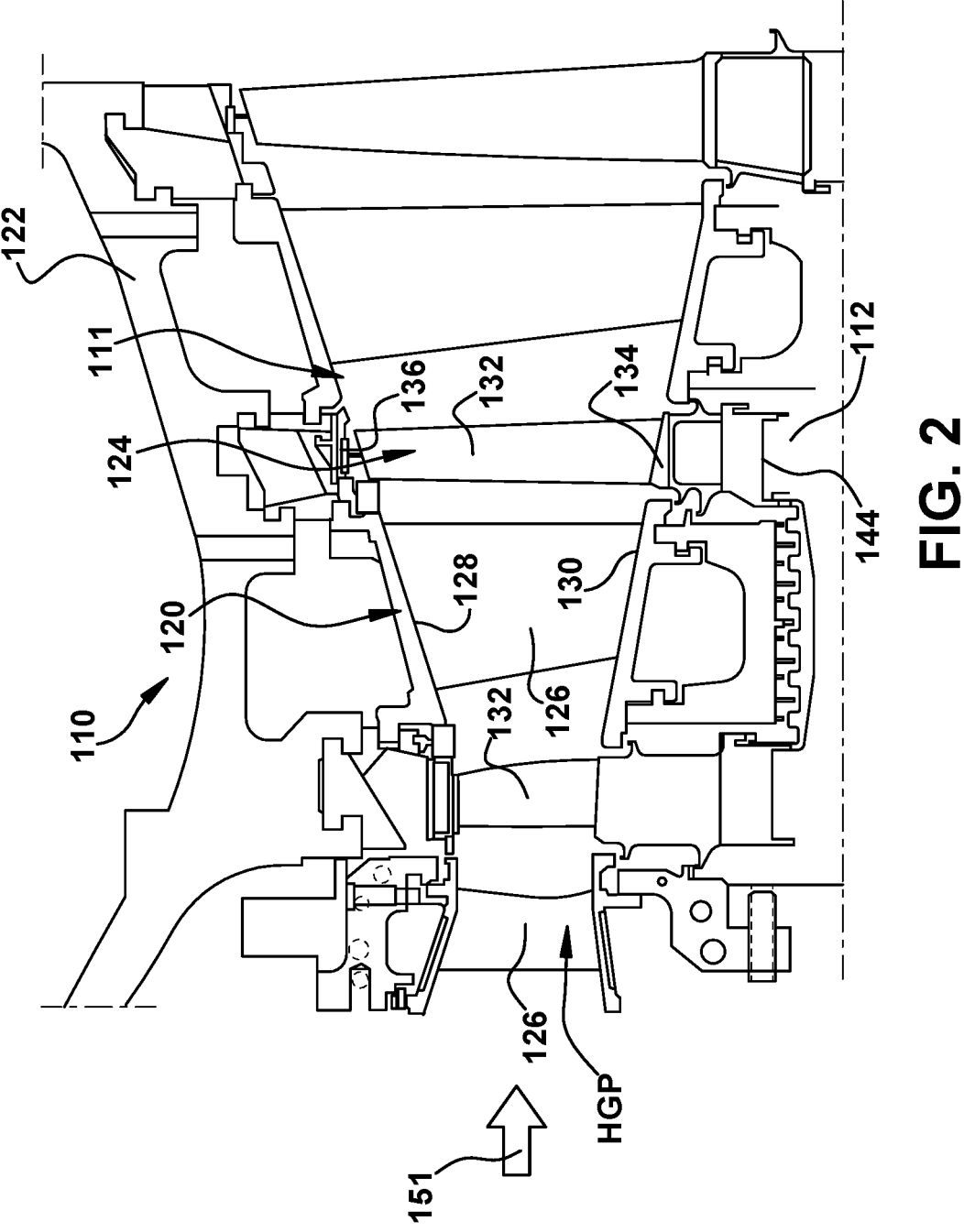
FIG. 2 shows a cross-sectional view of an illustrative gas turbine assembly that may be used with the gas turbine system in FIG. 1 and including a component according to embodiments of the disclosure.

FIG. 2 shows a cross-sectional view of an illustrative turbine assembly 110 of turbomachine 100 (FIG. 1) that may be used with the gas turbine system in FIG. 1. Turbine 111 of turbine assembly 110 includes a row of nozzle or vanes 120 coupled to a stationary casing 122 of turbomachine 100 and axially adjacent a row 124 of rotating blades 132. A stationary vane or nozzle 126 may be held in turbine assembly 110 by a radially outer platform 128 and a radially inner platform 130. Row 124 of blades in turbine assembly 110 includes rotating blades 132 coupled to rotor 112 and rotating with the rotor. Rotating blades 132 may include a radially inward platform 148 (at root of blade, FIG. 3) coupled to rotor 112 and, optionally, a radially outward tip shroud 136 (at tip of blade). As used herein, the term "component" may refer collectively to stationary nozzles 126, rotating blades 132 or any other structure in which metal coupons including porous region(s) according to the disclosure can be employed.

Figure 3:
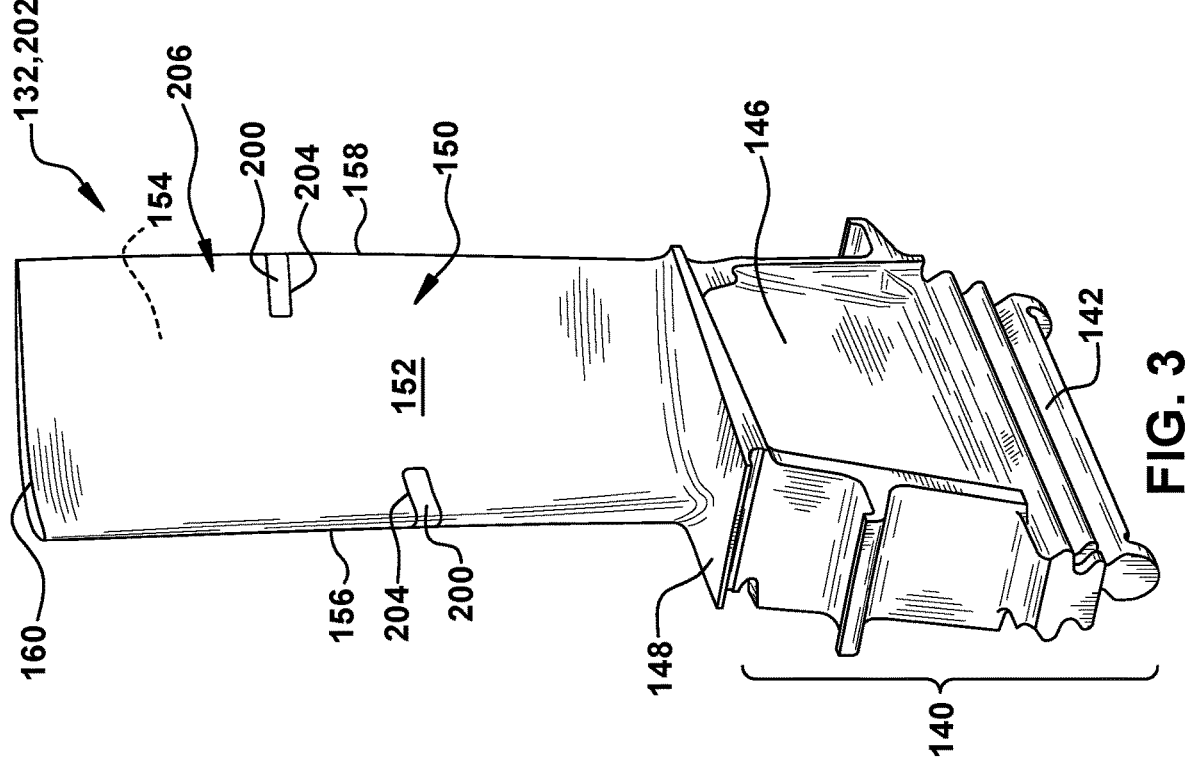
FIG. 3 shows a perspective view of a component in the form of a turbine rotating blade including a metal coupon according to embodiments of the disclosure.
Figure 4:
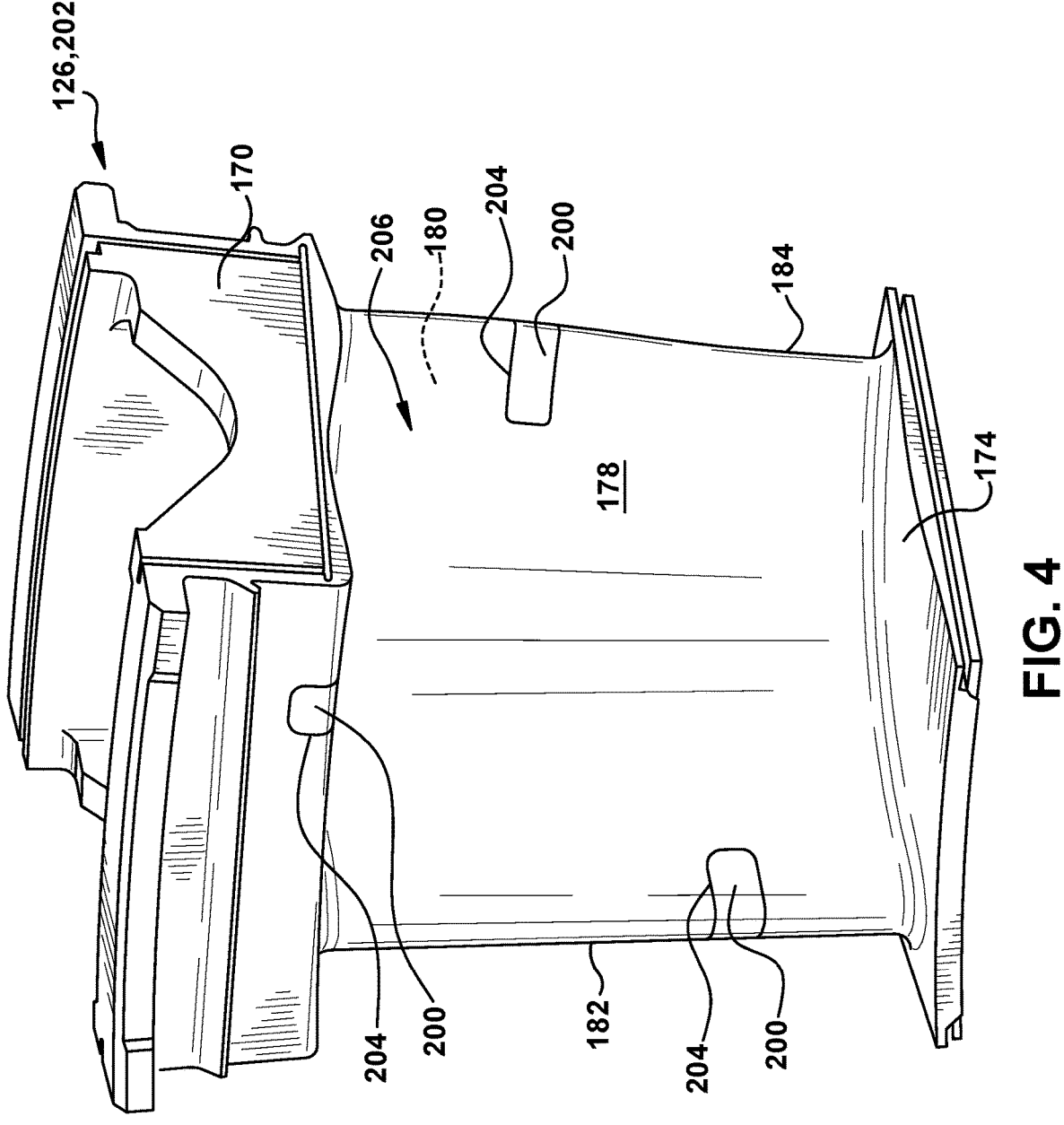
FIG. 4 shows a perspective view of a component in the form of a turbine nozzle including a metal coupon according to embodiments of the disclosure.

FIGS. 3 and 4 show illustrative components, such as hot gas path components of a turbomachine, in which teachings of the disclosure may be employed. FIG. 3 shows a perspective view of a turbine rotor blade 132 of the type in which embodiments of the present disclosure may be employed. Turbine rotor blade 132 includes a root 140 by which rotor blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of an airfoil 150 and root 140 and defines a portion of the inboard boundary of the flow path through turbine assembly 110. It will be appreciated that airfoil 150 is the active component of rotor blade 132 that intercepts the flow of working fluid 151 (FIG. 2), i.e., hot combustions gases, and induces the rotor disc to rotate. It will be seen that airfoil 150 of rotor blade 132 includes a concave pressure side (PS) outer wall 152 and a circumferentially or laterally opposite convex suction side (SS) outer wall 154 extending axially between opposite leading and trailing edges 156, 158 respectively. Side outer walls 152 and 154 also extend in the radial direction from platform 148 to an outboard tip 160, the latter of which may or may not include a tip shroud 136 (FIG. 2).

FIG. 4 shows a perspective view of a stationary nozzle 126 in which embodiments of the present disclosure may be employed. Stationary nozzle 126 includes an outer platform 170 by which stationary nozzle 126 attaches to stationary casing 122 (FIG. 2) of the turbomachine. Outer platform 170 may include any now known or later developed mounting configuration for mounting in a corresponding mount in the casing. Stationary nozzle 126 may further include an inner platform 174 for positioning between adjacent turbine rotor blades 132 (FIG. 3) and platform 148 (FIG. 3). Platforms 170, 174 define respective portions of the outboard and inboard boundary of the flow path through turbine assembly 110. It will be appreciated that airfoil 176 is the active component of stationary nozzle 126 that intercepts the flow of working fluid and directs it towards turbine rotor blades 132 (FIG. 3). It will be seen that airfoil 176 of stationary nozzle 126 includes a concave pressure side (PS) outer wall 178 and a circumferentially or laterally opposite convex suction side (SS) outer wall 180 extending axially between opposite leading and trailing edges 182, 184 respectively. Side outer walls 178 and 180 also extend in the radial direction from platform 170 to platform 174.

It is understood that blade 132 or nozzle 126 may include internal cooling structures including sources of coolant such as passages, conduits and other structure that deliver coolant to a surface thereof for film cooling. Coolant may include, for example, air from compressor 102.

Embodiments of the disclosure described herein may include aspects applicable to either stationary nozzle 126, turbine rotor blade 132 and/or any other industrial component that employs coupons. FIGS. 3 and 4 also show illustrative additively manufactured (AM) metal coupons 200 (hereafter "metal coupon(s) 200" or "AM metal coupons(s) 200" for brevity) in a component 202. More particularly, metal coupons 200 may be in a coupon opening 204 in a body 206 of component 202. A "coupon opening 204 in body 206" may be any size void in body 206 up to and including a removed section of body 206, e.g., tip shroud. For example, metal coupons 200 can be in coupon openings 204 in trailing edges 158, 184 of blade 132 or nozzle 126, respectively. Alternatively, metal coupons 200 can be in coupon openings 204 in leading edges 156, 182 of blade 132 or nozzle 126, respectively. Metal coupon 200 could also be in any tip (not shown) of blade 132 or platform 170 (shown in FIG. 4), 174 of nozzle 126. It is emphasized, however, that metal coupons 200 can be employed in any coupon opening 204 in a body 206 of component 202. Body 206 can be any part of, or all, of component 202.

Figure 5:
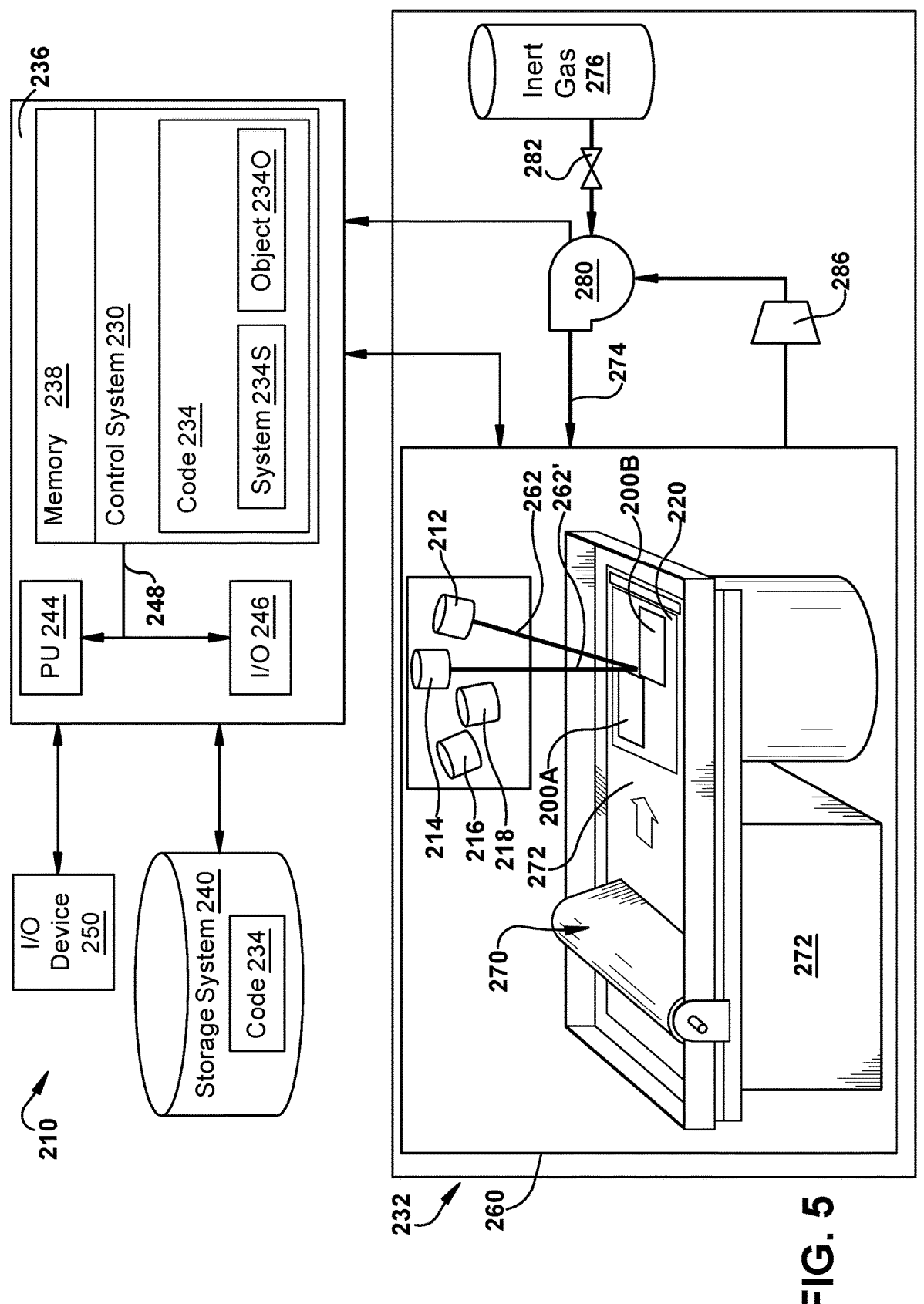
FIG. 5 shows a schematic block diagram of an illustrative additive manufacturing system for additively manufacturing a metal coupon according to embodiments of the disclosure.

Additively manufactured metal coupons 200 that include one or more porous regions therein and may be additively manufactured using any now known or later developed technique capable of forming porous region(s). FIG. 5 shows a schematic/block view of an illustrative computerized metal powder additive manufacturing system 210 (hereinafter 'AM system 210') for generating metal coupon 200 or multiple metal coupons 200A, 200B, of which only a single layer is shown. The teachings of the disclosures will be described relative to building metal coupon 200 using multiple melting beam sources 212, 214, 216, 218, but it is emphasized and will be readily recognized that the teachings of the disclosure are equally applicable to build multiple coupons 200A, 200B using any number of melting beam sources. In this example, AM system 210 is arranged for direct metal laser melting (DMLM). It is understood that the general teachings of the disclosure are equally applicable to other forms of metal powder additive manufacturing such as but not limited to powder bed fusion, direct metal laser sintering (DMLS), electron beam melting (EBM), selective laser sintering (SLS), selective laser melting (SLM), and perhaps other forms of additive manufacturing (i.e., other than metal powder applications). Coupons 200A, 200B are illustrated as rectangular elements; however, it is understood that the additive manufacturing process can be readily adapted to manufacture any shaped coupon, a large variety of different coupons, and a large number of coupons on build platform 220.

AM system 210 generally includes an additive manufacturing control system 230 ("control system") and an AM printer 232. As will be described, control system 230 executes set of computer-executable instructions or code 234 to generate coupon(s) 200 using multiple melting beam sources 212, 214, 216, 218. In the example shown, four melting beam sources may include four lasers. However, the teachings of the disclosures are applicable to any melting beam source, e.g., an electron beam, laser, etc. Control system 230 is shown implemented on computer 236 as computer program code. To this extent, computer 236 is shown including a memory 238 and/or storage system 240, a processor unit (PU) 244, an input/output (I/O) interface 246, and a bus 248. Further, computer 236 is shown in communication with an external I/O device/resource 250. In general, processor unit (PU) 244 executes computer program code 234 that is stored in memory 238 and/or storage system 240. While executing computer program code 234, processor unit (PU) 244 can read and/or write data to/from memory 238, storage system 240, I/O device 250 and/or AM printer 232. Bus 248 provides a communication link between each of the components in computer 236, and I/O device 250 can comprise any device that enables a user to interact with computer 236 (e.g., keyboard, pointing device, display, etc.). Computer 236 is only representative of various possible combinations of hardware and software. For example, processor unit (PU) 244 may comprise a single processing unit or be distributed across one or more processing units in one or more locations, e.g., on a client and server. Similarly, memory 238 and/or storage system 240 may reside at one or more physical locations. Memory 238 and/or storage system 240 can comprise any combination of various types of non-transitory computer readable storage medium including magnetic media, optical media, random access memory (RAM), read only memory (ROM), etc. Computer 236 can comprise any type of computing device such as an industrial controller, a network server, a desktop computer, a laptop, a handheld device, etc.

As noted, AM system 210 and, in particular control system 230, executes code 234 to generate metal coupon(s) 200. Code 234 can include, among other things, a set of computer-executable instructions 234S (herein also referred to as 'code 234S') for operating AM printer 232, and a set of computer-executable instructions 234O (herein also referred to as 'code 234O') defining metal coupon(s) 200 to be physically generated by AM printer 232. As described herein, additive manufacturing processes begin with a non-transitory computer readable storage medium (e.g., memory 238, storage system 240, etc.) storing code 234. Set of computer-executable instructions 234S for operating AM printer 232 may include any now known or later developed software code capable of operating AM printer 232.

Set of computer-executable instructions 234O defining metal coupon(s) 200 may include a precisely defined 3D model of a coupon and can be generated from any of a large variety of well-known computer aided design (CAD) software systems such as AutoCAD®, TurboCAD®, DesignCAD 3D Max, etc. In this regard, code 234O can include any now known or later developed file format. Furthermore, code 234O representative of metal coupon(s) 200 may be translated between different formats. For example, code 234O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 234O representative of metal coupon(s) 200 may also be converted into a set of data signals and transmitted, received as a set of data signals and converted to code, stored, etc., as necessary. Code 234O may be configured according to embodiments of the disclosure to allow for formation of border and internal sections in overlapping field regions, as will be described. In any event, code 234O may be an input to AM system 210 and may come from a part designer, an intellectual property (IP) provider, a design company, the operator or owner of AM system 210, or from other sources. In any event, control system 230 executes code 234S and 234O, dividing metal coupon(s) 200 into a series of thin slices that assembles using AM printer 232 in successive layers of material.

AM printer 232 may include a processing chamber 260 that is sealed to provide a controlled atmosphere for metal coupon(s) 200 printing. A build platform 220, upon which metal coupon(s) 200 is/are built, is positioned within processing chamber 260. A number of melting beam sources 212, 214, 216, 218 are configured to melt layers of metal powder on build platform 220 to generate coupon(s) 200. While four melting beam sources 212, 214, 216, 218 are illustrated, it is emphasized that the teachings of the disclosure are applicable to a system employing any number of sources, e.g., 1, 2, 3, or 5 or more. As understood in the field, each melting beam source 212, 214, 216, 218 may have a field including a non-overlapping field region, respectively, in which it can exclusively melt metal powder, and may include at least one overlapping field region in which two or more sources can melt metal powder. In this regard, each melting beam source 212, 214, 216, 218 may generate a melting beam, respectively, that fuses particles for each slice, as defined by code 234O. For example, in FIG. 5, melting beam source 212 is shown creating a layer of metal coupon(s) 200 using melting beam 262 in one region, while melting beam source 214 is shown creating a layer of metal coupon(s) 200 using melting beam 262' in another region. Each melting beam source 212, 214, 216, 218 is calibrated in any now known or later developed manner. That is, each melting beam source 212, 214, 216, 218 has had its laser or electron beam's anticipated position relative to build platform 220 correlated with its actual position in order to provide an individual position correction (not shown) to ensure its individual accuracy. In one embodiment, each of plurality melting beam sources 212, 214, 216, 218 may create melting beams, e.g., 262, 262', having the same cross-sectional dimensions (e.g., shape and size in operation), power and scan speed.

Continuing with FIG. 5, an applicator (or re-coater blade) 270 may create a thin layer of raw material 272 spread out as the blank canvas from which each successive slice of the final coupon will be created. Various parts of AM printer 232 may move to accommodate the addition of each new layer, e.g., a build platform 220 may lower and/or chamber 260 and/or applicator 270 may rise after each layer. The process may use different raw materials in the form of fine-grain metal powder, a stock of which may be held in a chamber 260 accessible by applicator 270. In the instant case, coupon(s) 200 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.). Other possibilities include, for example, René 108, CM 247 LC, Mar M 247 and any precipitation harden-able (PH) nickel alloy.

Processing chamber 260 is filled with an inert gas such as argon or nitrogen and controlled to minimize or eliminate oxygen. Control system 230 is configured to control a flow of a gas mixture 274 within processing chamber 260 from a source of inert gas 276. In this case, control system 230 may control a pump 280, and/or a flow valve system 282 for inert gas to control the content of gas mixture 274. Flow valve system 282 may include one or more computer controllable valves, flow sensors, temperature sensors, pressure sensors, etc., capable of precisely controlling flow of the particular gas. Pump 280 may be provided with or without valve system 282. Where pump 280 is omitted, inert gas may simply enter a conduit or manifold prior to introduction to processing chamber 260. Source of inert gas 276 may take the form of any conventional source for the material contained therein, e.g., a tank, reservoir or other source. Any sensors (not shown) required to measure gas mixture 274 may be provided. Gas mixture 274 may be filtered using a filter 286 in a conventional manner.

In operation, build platform 220 with metal powder thereon is provided within processing chamber 260, and control system 230 controls flow of gas mixture 274 within processing chamber 260 from source of inert gas 276. Control system 230 also controls AM printer 232, and in particular, applicator 270 and melting beam sources 212, 214, 216, 218 to sequentially melt layers of metal powder on build platform 220 to generate metal coupon(s) 200 according to embodiments of the disclosure.

While a particular AM system 210 has been described herein, it is emphasized that the teachings of the disclosure are not limited to any particular additive manufacturing system or method. Also, while the teachings of the disclosure relate to an additively manufactured metal coupon(s) 200, it will be recognized that component 202 may be manufactured in any now known or later developed manner such as additive manufacturing (perhaps similar to that described for metal coupon(s) 200), casting, or other methodology. Component 202 may include any of the material(s) listed herein for metal coupon(s) 200.

Figure 7A:
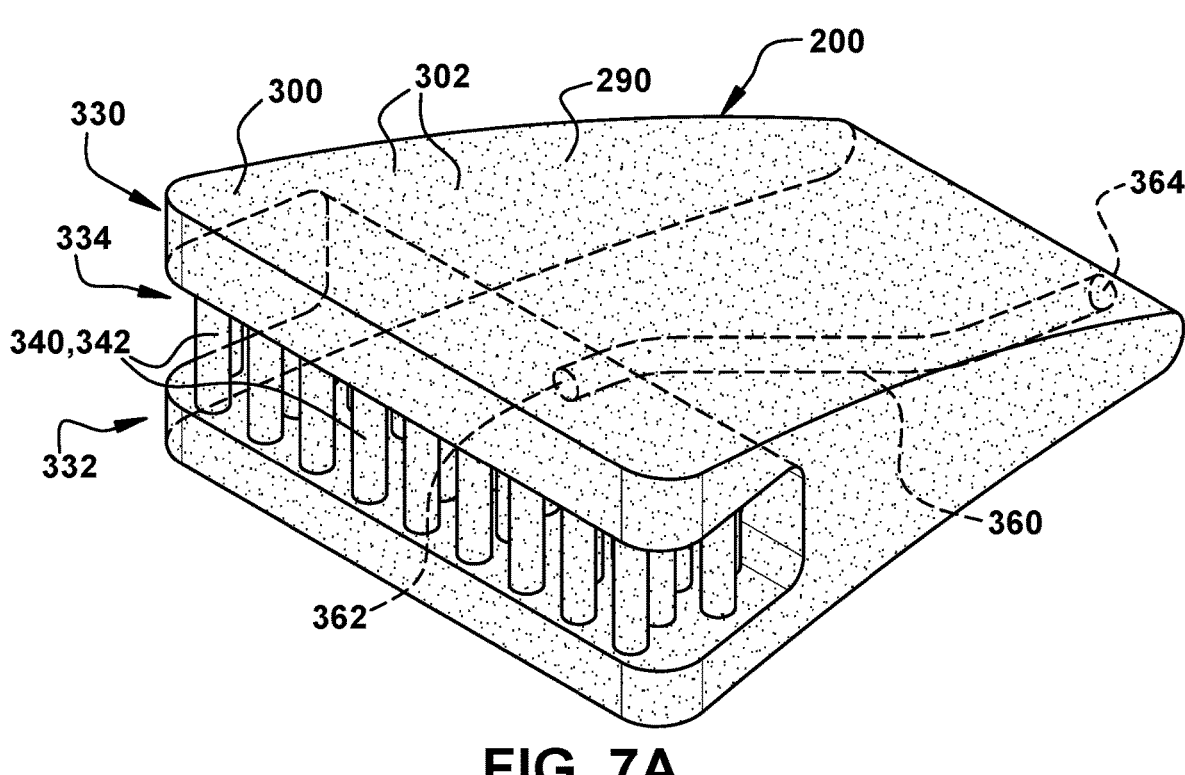
FIGS. 7A-N show various views of a metal coupon according to various embodiments of the disclosure.
Figure 7B:
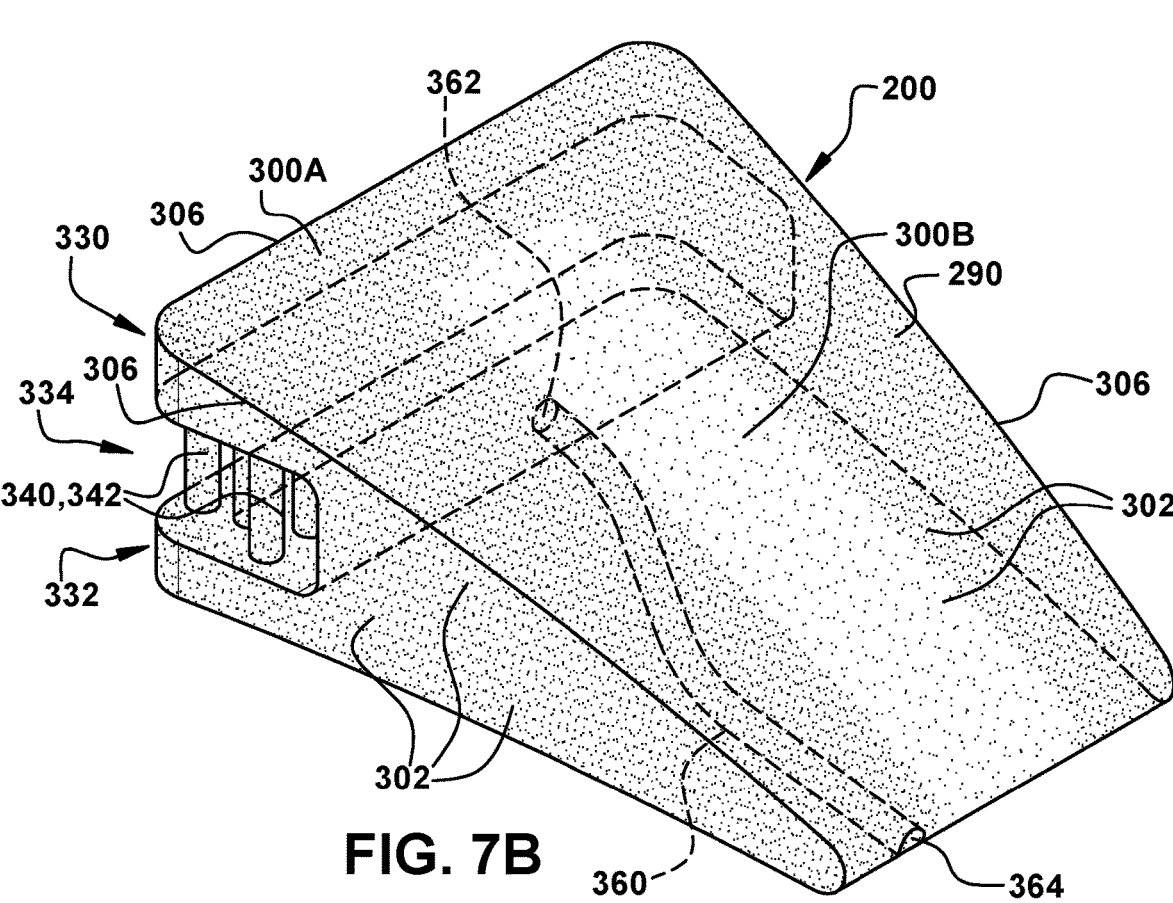
Figures 7C, 7D:
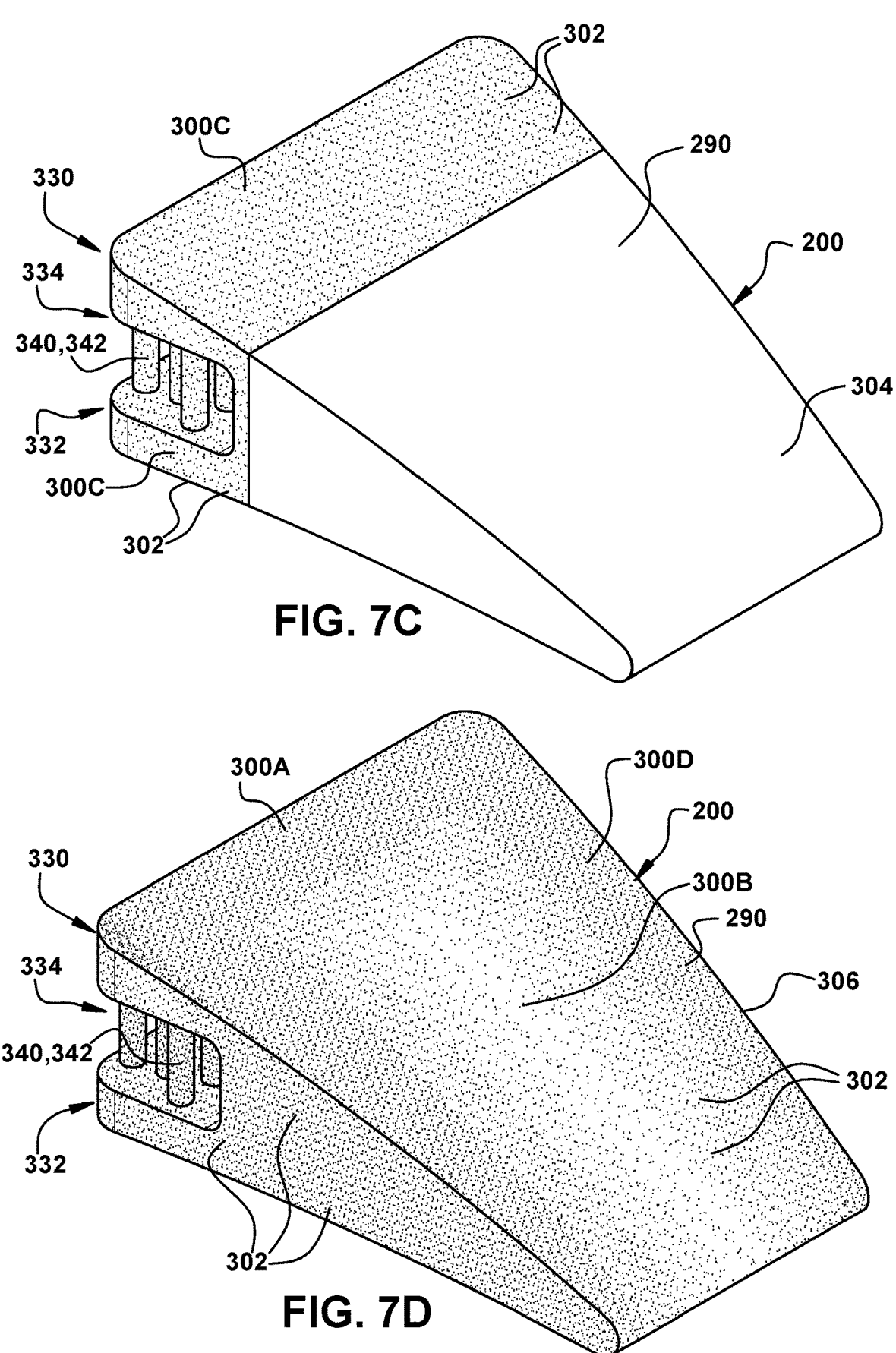
Figure 7E:
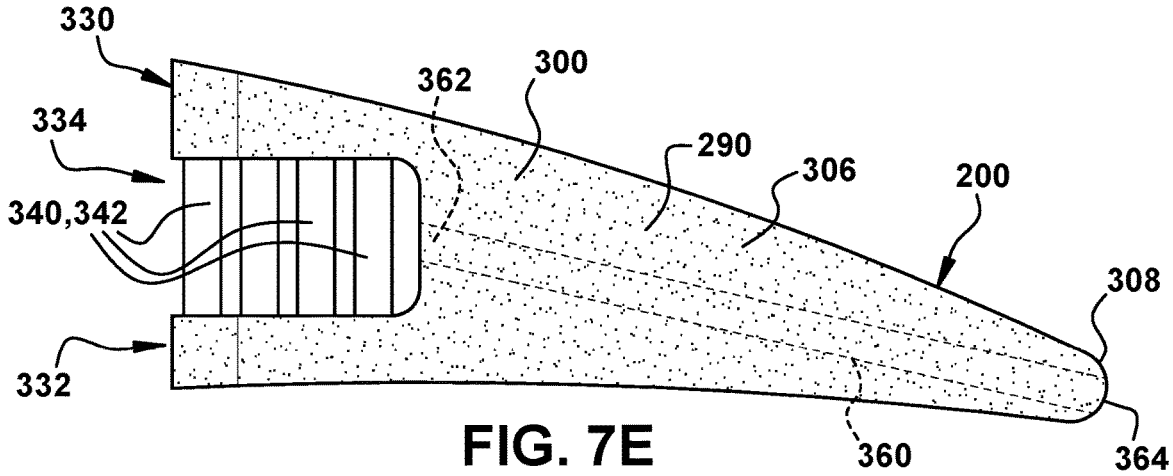
Figure 7F:
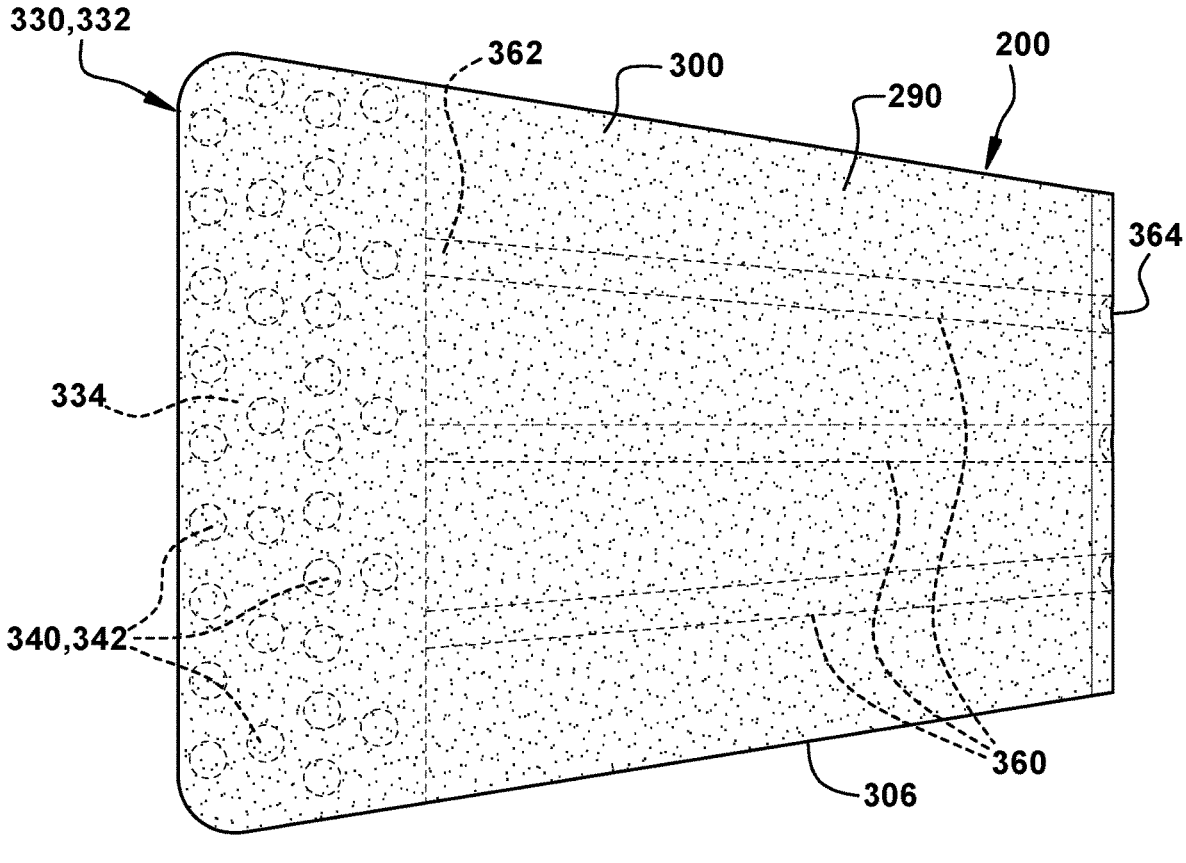

FIGS. 7A-D show perspective views, FIG. 7E shows a side view and FIG. 7F shows a top-down view of an illustrative additively manufactured (AM) metal coupon 200 for insertion in component 202. Metal coupon 200 includes additively manufactured (AM) primary member 290 having a member porosity between 2% to 50% open space volume to total volume of the primary member. More specifically, primary member 290 has one or more porous regions 300 (with pores 302). ("Member porosity" as used herein refers generally and collectively to the porosity or porosities of primary member 290, which as will be described, can be a single porosity or many different porosities depending on the arrangement of porous regions therein. Where differentiation between different member porosities is required, the terms "first member porosity" or "second member porosity" or "member variable porosity," where appropriate, will be used.)

FIG. 7A shows metal coupon 200 with a single porous region 300 of a first member porosity (entire metal coupon 200 has first member porosity); FIG. 7B shows metal coupon 200 with more than one porous region 300A-B having different porosities within the stated range; FIG. 7C shows metal coupon 200 with one or more porous regions 300A-B having different porosities within the stated range and a solid region 304; and FIG. 7D shows metal coupon 200 with a variable porosity region 300D within the stated range between (and perhaps including) first porous region 300A and second porous region 300B. Primary member 290 also has a first portion 330 distanced from a second portion 332 by a gap 334. Metal coupon 200 also includes at least one thermal transfer structure 340 extending between first portion 330 and second portion 332 across gap 334. Gap 334 is an open space or void formed where metal coupon 200 would normally be solid material, and thus represents material that has been removed to provide space for thermal transfer structures 340 (hereafter "TT structure(s) 340" or "TT structure 340" for brevity).

Metal coupon 200 in FIGS. 7A-F are shown having a shape configured to be positioned in, as shown in FIGS. 3, 4 and 8B-F, coupon opening 204 in trailing edge 158 or 184 of blade 132 or nozzle 126, respectively, or coupon opening 204 in leading edge 156 or 182 of blade 132 or nozzle 126, respectively. Metal coupon 200 could also be in any tip (not shown) of blade 132 or platforms 170, 174 (FIG. 4) of nozzle 126. It is emphasized, however, that metal coupons 200 can be employed in any coupon opening 204 in any part of body 206 of any component 202.

"Porosity," as used herein, is a ratio of open space volume to total volume of the stated structure, e.g., porous regions, TT structure, metal coupon, etc. Typically, in this regard, porosity is stated as a percentage of volume of open space to overall or total volume of the stated structure. The open space in terms of porosity is empty areas in a solid material and may be referred to herein as "pores" 302 and may include interconnecting passages in the material of the stated structure. A "porous region" in metal coupon 200 is thus less than 100% solid (100% solid corresponds to 0% porosity) and includes open spaces in the form of pores 302 and/or interconnecting passages. Porous metal coupons 200 may include solid regions, but also include one or more porous regions that are less than 100% solid. As noted, porous metal coupons 200 may also include gap 334, i.e., gap 334 having 100% porosity. Gap 334 is significantly larger than any open space in a porous region 300 of primary member 290. As used herein, a three-dimensional boundary of a porous region or sub-region for purpose of identifying a "total volume" thereof can be identified by where a change in porosity of greater than 2% relative to an adjacent region or sub-region occurs within metal coupon 200 and/or an edge of metal coupon 200 exists. "Open space volume" is collectively a three-dimensional space that is empty, i.e., a void, gap, empty space and/or not filled with material, within a region or sub-region (it does not include gap 334). As used herein, "different porosities" or "differences in porosity," generally means any variety of characteristics such as: percentage of open space volume to total volume, a number of pores 302 in a given volume, the volume (i.e., size) of pores 302, shape of pores 302, and variations in connecting passages between pores 302 that may not be recognized as actual discrete pores (referred to herein as "pore connecting passages"). As one non-limiting example only, pore size can be in a range of, for example, $1.07 \times 10^{-6}$ to $8.58 \times 10^{-3}$ cubic millimeters ($6.54 \times 10^{-11}$ to $5.24 \times 10^{-7}$ cubic inches), or as another non-limiting example, the pore diameter can be in a range of 0.0127 millimeters (mm) to 0.254 mm (0.0005 inches to 0.01 inches). In the drawings, the different porous regions or sub-regions are typically shown as being continuous or in contact with one another, it is emphasized however that they can be isolated from one another in any manner, e.g., with solid areas therebetween. That is, a single metal coupon may include one or more isolated, non-contacting porous regions or sub-regions. Note, the terms "region" and/or "sub-region" may be used interchangeably to denote changes in porosity. With differences in, for example, pore shape or pore connecting passages, it will be recognized that differences in porosity may not be exclusively based on percentage of open space volume to total volume. However, where differences in porosities are compared in terms of degree, e.g., higher or lower, the difference referenced is exclusively that of the volume characteristics, i.e., percentage of open space volume to total volume.

Porous metal coupon(s) 200 can be formed with different porous regions with different porosities (which may or may not include one or more porous sub-regions with different porosities) using AM system 210 as described herein, or any other metal additive manufacturing system or method capable of forming porous metals. In terms of AM system 210 operation, melting beam sources 212, 214, 216, 218 can be programmed to intermittently not sinter metal, leaving metal powder rather than solidified (sintered) metal powder material. This process may include overlapping laser field regions by different amounts and/or designing pores 302 into a build file, i.e., code 234O. Less overlap of each laser scan creates more porosity, and more lasers overlap between successive scans creates less porosity. Laser spot size, scanning speed, focus and/or power can also be controlled to adjust porosity. More particularly, the additive manufacturing includes using AM system 210 having one or more melting beam sources 212, 214, 216, 218 to fuse together the layers of the metal powder and adjusting a parameter of the system to control the porosity of at least two porous regions. The adjusting the parameter may include at least one of: adjusting an amount of overlap of a melting area of the one or more melting beam 262, 262' (FIG. 5) (from sources 212, 214, 216, 218); adjusting system scanning speed; or adjusting at least one of melting beam spot size, focus, and/or power. When the un-melted metal powder is removed from metal coupon(s) 200, it leaves pores 302 with interconnecting passages between pores 302 and creating one or more porous region(s) in metal coupon 200. In any event, the layered manufacture of metal coupon 200 can be controlled to create the desired porosity for any number, shape and/or size of porous regions within any desired layers of metal coupon(s) 200.

FIGS. 6A-D show top-down schematic views of sample metal coupons 200 having different porosities. Pores 302 are shown as darker open spaces in the drawings. FIG. 6A shows a sample metal coupon 200 having a first porosity of approximately 40% open space volume to total volume of the sample (with a generally high amount of open space and more or larger pores 302), FIG. 6B shows a sample metal coupon 200 having a first porosity of approximately 30% open space volume to total volume of sample, FIG. 6C shows a sample metal coupon 200 having a first porosity of approximately 20% open space volume to total volume of the sample, FIG. 6D shows a sample metal coupon 200 having a first porosity of approximately 10% open space volume to total volume of the sample (with a generally low amount of open space). Each porous region may have a porosity between 2% to 50% open space volume to total volume of the porous region, i.e., 2% to 50% open space with the other 50% to 98% solid. In other embodiments, each porosity may be between 10% to 40% open space volume to total volume of porous region 300, i.e., 10% to 40% open space with the other 60% to 90% solid. In other embodiments, porous region(s) can be provided in metal coupons 200 having a porosity in a range of less than 10%, in a range of less than 15%, in a range of less than 20%, in a range of less than 25%, in a range of less than 30%, in a range of less than 35%, in a range of less than 40%, in a range of less than 45%, in a range of 2% to 45%, in a range of 2% to 40%, in a range of 2% to 35%, in a range of 2% to 30%, in a range of 2% to 25%, in a range of 2% to 20%, in a range of 5% to 45%, in a range of 5% to 40%, in a range of 5% to 35%, in a range of 5% to 30%, in a range of 5% to 25%, in a range of 5% to 20%, in a range of 10% to 45%, in a range of 10% to 40%, in a range of 10% to 35%, in a range of 10% to 30%, in a range of 10% to 25%, in a range of 10% to 20%, in a range of 15% to 45%, in a range of 15% to 40%, in a range of 15% to 35%, in a range of 15% to 30%, in a range of 15% to 25%, in a range of 15% to 20%, in a range of 10% to 50%, in a range of 20% to 50%, in a range of 25% to 50%, in a range of 30% to 50%, in a range of 35% to 50%, or in a range of 40% to 50%. As will be described herein, other ranges of porosity are also possible.

As shown FIG. 7A, metal coupon 200 may have a first porous region 300 having a first member porosity. In FIG. 7A, metal coupon 200 includes a single porous region 300 with a single, first member porosity. In FIG. 7A, the entire metal coupon 200 includes first member porosity. Hence, each layer of metal coupon 200 has the same porosity. In FIG. 7B, metal coupon 200 includes two porous regions 300A-B each with a different porosity. Here, areas within layers of metal coupon 200 that define regions 300A-B can be formed to include pores 302. In FIG. 7C, metal coupon 200 includes one or more porous regions 300C, each perhaps with the same or different porosity, and a solid region 304. Here, areas within layers of metal coupon 200 that define regions 300A-B or 300C can be formed to include pores 302, and areas within layer of metal coupon 200 that define solid region 304 are formed without pores 302. Although not necessary in all cases, porous regions 300C may be located in first and second portions 330, 332 of primary member 290 separated by gap 334. With this arrangement, as will be described further, braze material 310 (FIGS. 9A-C) may infiltrate TT structure(s) 340 that are also porous. In FIG. 7D, metal coupon 200 includes variable porosity region 300D between (and perhaps including part of) first porous region 300A and second porous region 300B. Here, areas within layers of metal coupon 200 that define regions 300A-B or variably porous region 300D can be formed to include pores 302, e.g., of different size and/or number, to create different porosities. The variable porosity region 300D may have any porosity that changes, e.g., increases, decreases and/or both increases and decreases. The change in porosity may be gradual, or stepped or otherwise incremental. Each porous region 300 may have a porosity between 2% to 50% open space volume to total volume of porous region 300, i.e., 2% to 50% open space with the other 50% to 98% solid. In other embodiments, each porosity may be any range as stated herein.

Figures 7G, 7H, 7I, 7J:
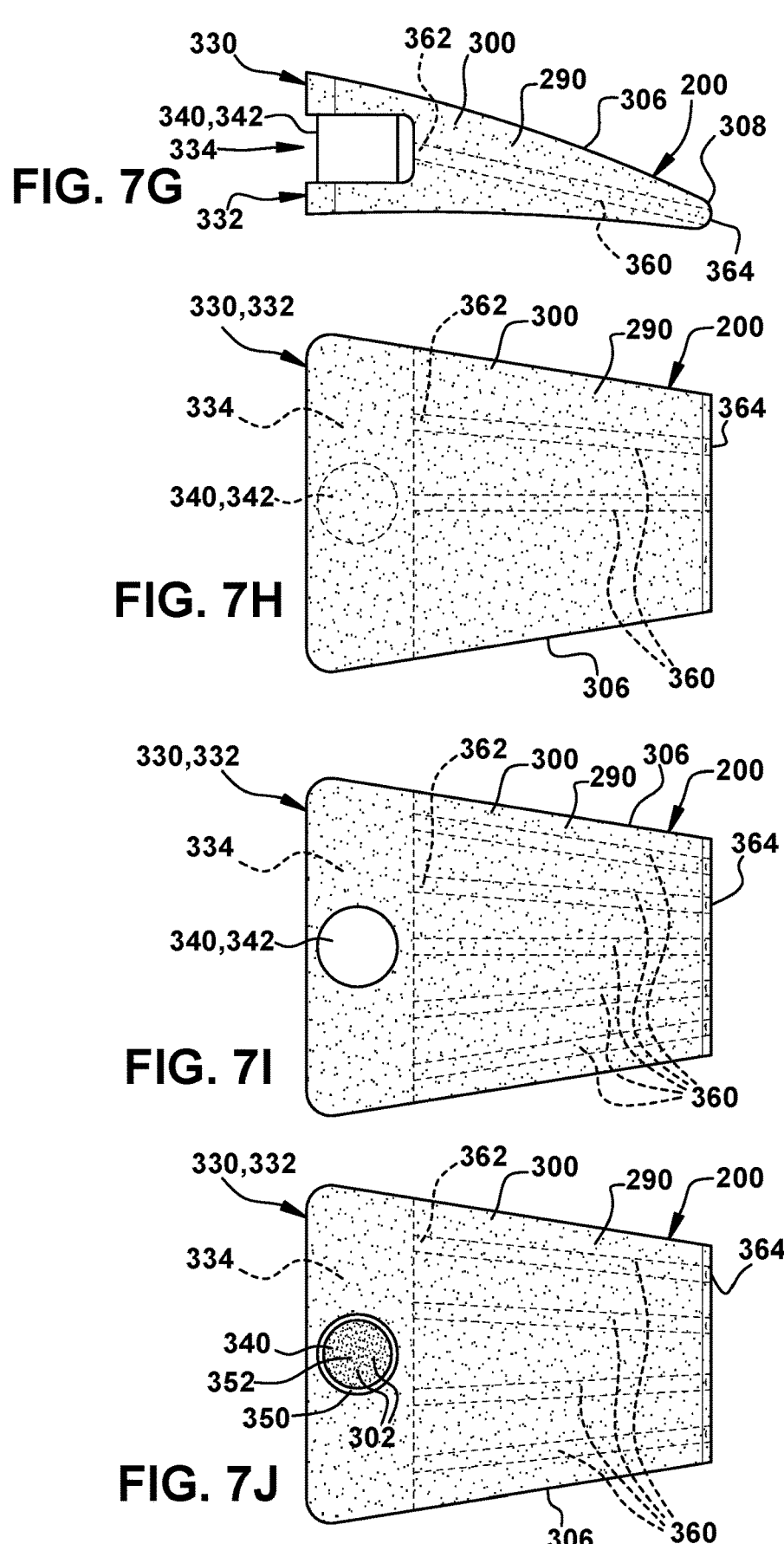

TT structure(s) 340 can take a variety of forms. FIGS. 7G and 7N show side views and FIGS. 7H-L and 7M show top-down views of various alternative arrangements of TT structure(s) 340 in metal coupon 200. As shown in FIGS. 7A-M, TT structure(s) 340 may include at least one of a pin 342 and/or a fin 344 extending between first portion 330 and second portion 332 across gap 334. In certain embodiments, TT structure(s) 340 include a plurality of pin(s) 342 and/or a plurality of fin(s) 344 extending between first portion 330 and second portion 332 across gap 334. FIGS. 7A-F show embodiments having a plurality of pins 342; FIG. 7H-J show a single pin 342; FIG. 7K shows a plurality of fins 344; and FIGS. 7L-M show a plurality of pins 342 and fins 344. FIGS. 7G and 7N show the sides of one or more TT structure(s) 340. Pins 342 have a generally uniform cross-sectional dimension and have cross-sectional shapes such as but not limited to: circular, square and/or polygonal (e.g., pentagonal, octagonal, etc.). In contrast, as shown in FIGS. 7K-M, fins 344 have some elongated dimension along at least one direction of the fins and can have cross-sectional shapes such as but not limited to: oval, elliptical, football-shaped, airfoil, etc.

Pins 342 and fins 344 may also include exterior features to enhance cooling. Cooling may be enhanced with bumps, ribs, dimples (hereinafter generically referred to as turbulators) formed on the exterior surface of the pins 342 and fins 344 to further augment convection cooling. As used herein, a "turbulator" may be any feature or structure positioned on the surface of pins 342 and fins 344 within a fluid passageway and configured for disturbing, agitating, or otherwise affecting the flow of fluid within that passageway. The turbulators may be formed in any suitable size, number, spacing, shape, and orientation. The turbulators may have any suitable cross-sectional shape. For example, turbulators may have circular, non-circular, elliptical, oblong, irregular, rectangular or any other cross-sectional shape suitable for a particular flow of heat exchange fluid. Other turbulator configurations are considered to be within the scope of the presently described embodiments.

TT structure(s) 340, e.g., pin(s) 342 and/or fin(s) 344, can be arranged in any desired manner to provide, for example, sufficient structural support, thermal rejection and/or coolant flow direction. For example, as shown in non-limiting embodiments of FIGS. 7A-F, pins 342 can be arranged in rows or staggered rows. In another non-limiting example, as shown in FIGS. 7K-L, pins 342 and fins 344 are arranged together in one or more rows. Other arrangements are also possible.

TT structure(s) 340 can have a variety of physical forms. As shown in FIGS. 7B, 7E-7I, TT structure(s) 340 may be solid, i.e., 0% porosity. In other embodiments, as shown in FIG. 7M, TT structure(s) 340 may be hollow, i.e., with outer layer(s) that are 0% porosity and a hollow center 380 that is open space (100% porosity). Alternatively, in FIGS. 7A, 7C-D and 7J, TT structure(s) 340 are at least partially porous. In certain embodiments, as shown in FIGS. 7A and 7C, TT structure(s) 340 may have a TT structure porosity that is the same as any member porosity of primary member 290 or at least the same as first and second portions 330, 332 (FIG. 7C) thereof, e.g., where primary member 290 generally includes a single porosity. In other embodiments, as shown in FIGS. 7B, 7D and 7J, TT structure(s) 340 have a TT structure porosity different than any member porosity of primary member 290, or at least different than a member porosity of first and second portions 330, 332 of primary member 290 adjacent to TT structure(s) 340. The TT structure porosity can be between 2% to 50% open space volume to total volume of a respective TT structure 340. In alternative embodiments, the TT structure porosity can be any of the other ranges described herein for the member porosity.

As shown in FIG. 7J, regardless of whether TT structure(s) 340 have the member porosity or a different, TT structure porosity, in certain embodiments, a braze material infiltration barrier 350 may encapsulate a side of TT structure(s) 340. Where TT structure 340 has the member porosity, a center 352 of TT structure(s) has the same porosity as the member porosity, i.e., inside barrier 350. That is, center 352 of TT structure(s) has the member porosity. In contrast, where TT structure 340 has a different, TT structure porosity, center 352 of TT structure(s) has that TT structure porosity, i.e., inside barrier 350. In any event, the porous part of TT structure 340 is inside barrier 350. Barrier 350 may include a low porosity material, e.g., melted metal powder, through which a braze material 310 (FIGS. 8E-F, 9A-C) to be used to couple metal coupon 200 in coupon opening 204 of body 206 of component 202 will not infiltrate. That is, barrier 350 has a porosity low enough to act as a braze material flow blocker and/or an encasement layer about porous center 352 of TT structure(s) 340. Barrier 350 may be relatively thin, e.g., less than 0.5 millimeters. The porosity of barrier 350 prevents braze material 310 (FIGS. 9A-C) infiltration into and/or penetration therethrough and may vary depending on the material of metal coupon 200 and that of braze material 310. That is, barrier 350 may allow some infiltration of braze material 310 side-wise but does not allow braze material 310 passing through outer surface of TT structure(s) 340. Longitudinally, braze material 310 may infiltrate at least partially into TT structure(s) 340 based at least on the characteristics of the porosity thereof. Although not necessary, barrier 350 may be 100% solid, i.e., with 0% open space. As will be described further herein, braze material 310 directed to infiltrate porous center 352 will infiltrate until it reaches barrier 350. Hence, barrier 350 may define a side-wise limit of braze material 310 infiltration into each porous center 352. In optional embodiments, as shown in the side view of FIG. 7N, porous center 352 of TT structure(s) 340 may be selectively blocked from porous fluid communication with the porous first portion 330 or second portion 332 of primary member 290. In this case, an end barrier 354 or 356 (white boxes) having similar porosity as that of barrier 350 could block porous fluid communication between porous center 352 of TT structure(s) 340 and a selective one of first portion

330 or second portion 332 of primary member 290. A braze material 310 infiltrating porous center 352 of each TT structure 340 may be the same or different as that used elsewhere in primary member 290, e.g., depending on whether the respective porous center 352 is porously in fluid communication (open) with first portion 330 and/or second portion 332 of primary member 290 and the brazing process used. The porosity of first and/or second portions 330, 332, the type of braze material 310 used, among other factors, may also impact what braze material 310 is in each porous center 352 of one or more TT structure(s) 340.

In certain embodiments, shown in FIGS. 7A-B, 7E-J, metal coupon 200 may optionally include one or more cooling passages 360 extending through at least part of primary member 290 and having a first end 362 (FIG. 7E) open to gap 334 and a second end 364 extending through an exterior surface 308 of primary member 290. While mostly shown having a linear path, cooling passage(s) 360 may extend in metal coupon 200 in any manner, e.g., in a serpentine path therein or extending through exterior surface 308 of metal coupon 200.

Referring to FIGS. 3-5, 7A-N and 8A-F, embodiments of a method according to the disclosure will now be described. The method may include inserting metal coupon 200 into a component 202, e.g., to repair or build component 202. FIG. 8A-F show perspective views of the method according to embodiments of the disclosure.

Figures 8A, 8B, 8C, 8D:
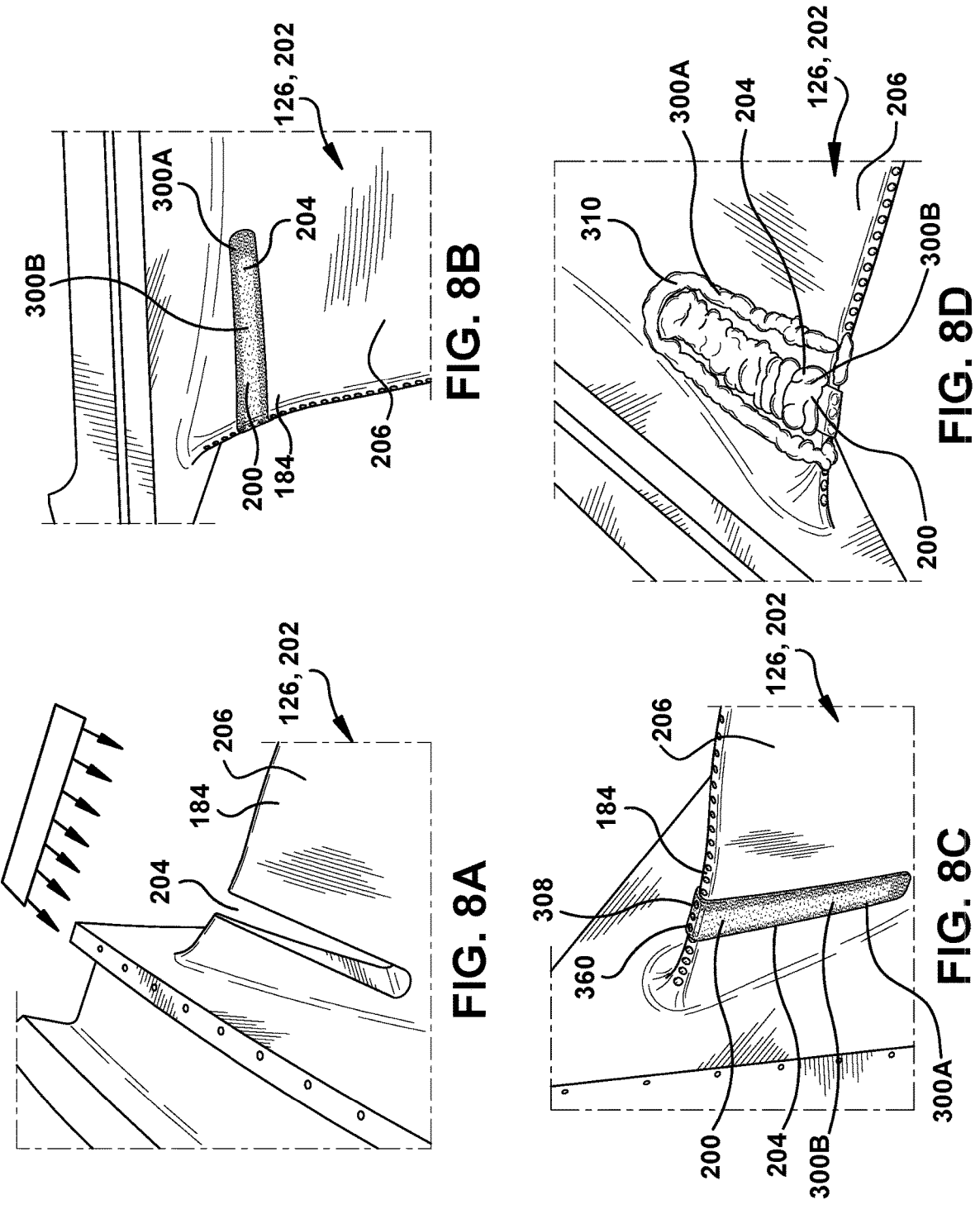
FIGS. 8A-F show perspective views of methods according to various embodiments of the disclosure.

FIG. 8A shows creating coupon opening 204 in body 206 of component 202. Coupon opening 204 is configured to receive metal coupon 200. Coupon opening 204 may have any shape desired. In certain applications, coupon opening 204 is created by removing a damaged part of body 206 of component 202, but coupon opening 204 can also be part of an original version of component 202, e.g., at a location that is challenging to manufacture with the rest of component 202. In the non-limiting example shown, coupon opening 204 is in a trailing edge 184 of a nozzle 126. FIG. 8A also shows creating a model of coupon opening 204. The model creating may include using any now known or later developed three-dimensional scanner (not shown, see arrows) to scan and create a digitized representation of coupon opening 204 relative to body 206 of component 202. As the process of scanning and modeling a part is well known in the art, further details are omitted so the reader can focus on the salient aspects of the disclosure.

FIGS. 5, 7A-N show additively manufacturing metal coupon 200 as described herein. The additive manufacturing may include any AM process described herein to manufacture porous metal coupon 200 (or dense or solid regions). The additive manufacturing may include selectively forming porous region(s), e.g., region(s) 300 of primary member 290 and/or porous regions of TT structure(s) 340, by controlling AM printer 232. The additive manufacturing may include manufacturing metal coupon 200 to generally match profile (e.g., shape, dimension, etc.) of coupon opening 204, or to have a near net shape of coupon opening 204 based on the model of coupon opening 204. As used herein, "near net shape" indicates metal coupon 200 is within desired manufacturing tolerances with no or minimal additional processing, e.g., machining, at the specified stage of the manufacturing process. Some additional texturing or polishing to an exterior surface may be desired. It is recognized that additional coatings may be applied once metal coupon 200 is in a component. When formed to a near net shape, metal coupon 200 may also have a shape after manufacture that, when positioned in coupon opening 204, is very close to surface(s) of body 206 required to couple metal coupon 200 in coupon opening 204, e.g., with selected braze material(s) and no or minimal required finishing methods, like machining or grinding. The use of porous region(s) 300 in primary member 290 of metal coupon 200 accommodates greater joint gap dimensional variance compared to solid coupons with narrow gaps for braze material because the porous regions provide improved braze material grasp and hold despite the larger gaps. While metal coupon 200 is shown additively manufactured as the FIG. 7B embodiment in FIGS. 8B-C, it may take any form described throughout the current disclosure.

In accordance with embodiments of the disclosure, porosity of one or more porous regions in metal coupon 200 is controlled, i.e., customized, to control flow of braze material therein during a subsequent brazing process that couples metal coupon(s) 200 into, as shown in FIGS. 3, 4 and 9A-C, coupon opening 204 in body 206 of component 202. Each porous region may be customized in terms of any of the afore-described characteristics that impact porosity. In addition, a shape and/or location of porous regions 300 of primary member 290 can be arranged to direct braze material as desired. For example, in FIG. 7A, an entirety of metal coupon 200 includes first porous region 300 so braze material 310 would be distributed uniformly therein. In contrast, in FIG. 7B, metal coupon 200 includes one porous region 300A near an edge 306 of metal coupon 200 where it would couple with coupon opening 204 (FIGS. 3-4) and a different porous region 300B with a different porosity adjacent to first porous region 300A, e.g., distal from edge 306. In this manner, braze material 310 would be distributed in different manners in each porous region 300, resulting in different physical characteristic(s) of metal coupon 200 in different regions thereof. More particularly, any number of porous regions 300 can be used to customize (create) at least one physical characteristic in component 202 that includes metal coupon 200, such as: joint adhesive bond strength, coupon strength, stress/strain resistance, ductility, wear resistance, oxidation resistance, cycle fatigue, thermal conductivity, electrical conductivity, surface roughness, hardness, and/or mass. In a non-comprehensive list of possibilities, metal coupon 200 may include a higher porosity in one region 300 to direct more braze material therein through capillary action compared to other regions of metal coupon 200 to control at least one physical characteristic of component 202. In another embodiment, metal coupon 200 may include a lower porosity in one region 300 to direct less braze material therein through capillary action compared to other regions of metal coupon 200 to control at least one physical characteristic of component 202. In other embodiments, metal coupon(s) 200 may include two or more porous regions 300 that collectively make up an entirety of metal coupon 200. As will be recognized, braze material 310 can also be directed into TT structure(s) 340 based on the porosity thereof. Any arrangement of porous regions in primary member 290 and/or TT structure(s) 340 is possible to create the desired braze material flow and infiltration. Any arrangement of TT structure(s) 340 may be used. In particular, any mixture of solid, hollow and/or porous TT structure(s) 340 may be used.

In certain embodiments, the additive manufacturing may also include forming any variety of improvements for component 202 in metal coupon 200 including, for example, structures not previously present in component 202. Component 202 may be an original component in need of improvements or a component including a removed or damaged part. For example, the additive manufacture may add TT structure(s) 340 where they were not previously present in component 202. In addition, the additive manufacture may optionally include forming cooling passage(s) 360 in metal coupon 200. Any advantageous internal structural changes can be made in metal coupon(s) 200. Any now known or later developed post-additive manufacture finishing processing may be optionally performed on metal coupon(s) 200, e.g., abrading to smooth surfaces thereof. Advantageously, however, teachings of the disclosure remove the need for certain finishing processes of metal coupon 200 in component 202, such as but not limited to: peening, heat treatment, and hot isostatic pressing (HIP).

FIGS. 8B and 8C show positioning metal coupon 200 in coupon opening 204 in body 206 of component 202. Metal coupon 200 may be positioned in opening 204 in body 206 in any now known or later developed manner, e.g., manually via a press fit or slip fit. Where necessary, metal coupon 200 may be held in place in any desired manner, e.g., adhesive, clamps, nickel-chromium tack welds, ball tacks, resistance weld, fusion tack weld, etc.

Figure 8F:
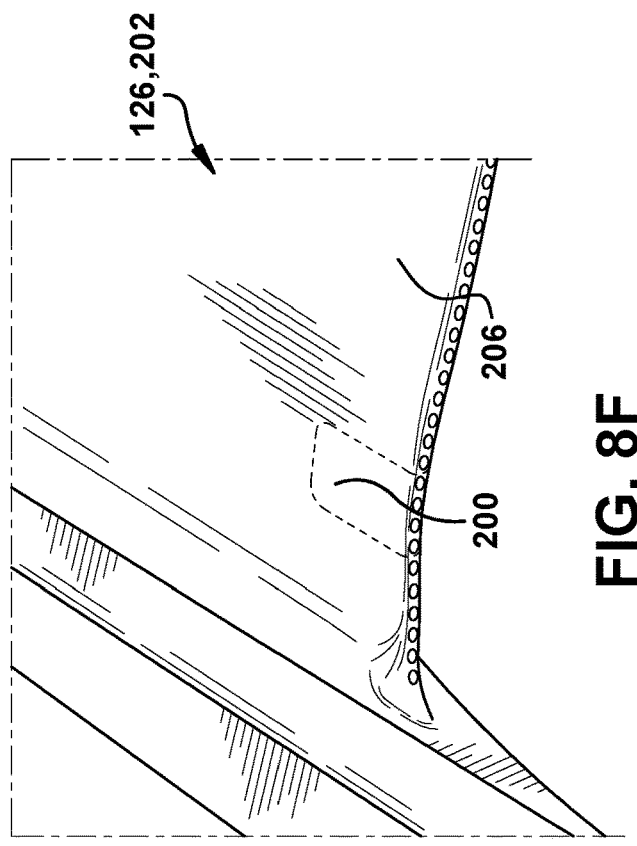
Figure 8E:
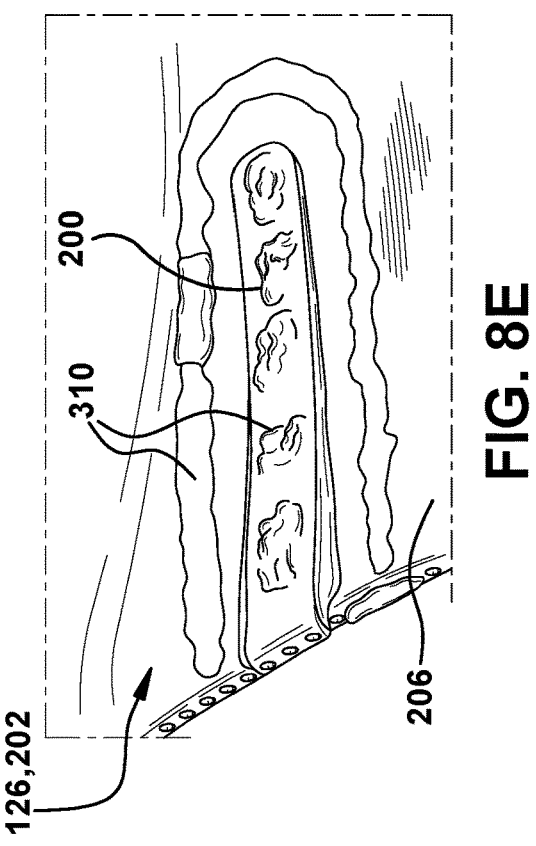

FIG. 8D-E shows infiltrating metal coupon 200 with a braze material 310 to couple the metal coupon in coupon opening 204 in body 206, i.e., performing a brazing process. Braze material 310 may include any now known or later developed brazing composition, such as but not limited to: GE (Alstom) B1P, Amdry™ D15, DF4B, or BRB, some the formulations of which are listed with other braze material formulations in the following table:

| Alloy | Ni | Cr | Co | B | Al | Ta | Y |
|---|---|---|---|---|---|---|---|
| Amdry ™ D15 | 65.10 | 15.30 | 10.30 | 2.30 | 3.50 | 3.50 | 0.00 |
| Amdry ™ BRB | 70.50 | 14.00 | 9.00 | 2.50 | 4.00 | 0.00 | 0.00 |
| Amdry ™ DF4B | 67.15 | 14.00 | 10.00 | 2.75 | 3.50 | 2.50 | 0.10 |

The infiltrating may include any now known or later developed brazing process such as using a vacuum brazing system, induction brazing system, and/or inert gas atmosphere heating system and related techniques. In one non-limiting example, the brazing may include, for example, applying the braze material (FIG. 8D) and applying heat (FIG. 8E) to cause it to flow into, through and around metal coupon 200 through capillary action.

The infiltrating injects braze material 310 into at least one of first porous region 300A based at least on a characteristic of a member porosity of first porous region 300A (i.e., first member porosity), and second porous region 300B based at least on a characteristic of a member porosity of second porous region 300B (i.e., second member porosity). Where member variable porosity region 300D (FIG. 7D) is present, the infiltrating includes causing braze material 310 to travel through and infiltrate first porous region 300A based on the characteristic of the first member porosity, travel through and infiltrate variable porosity region 300D based on a characteristic of variable porosity region 300D (e.g., gradient of the porosity, stepped porosity, among other things), and travel through and infiltrate second porous region 300B based on the characteristic of the second member porosity. Braze material 310 may also infiltrate TT structure(s) 340 based on a characteristic of the TT structure porosity therein.

The different porosities of porous regions 300A, 300B, any porosity of TT structure(s) 340, and perhaps variable porosity region 300D, result in different braze material 310 flow and infiltration in the brazing process. As a result of the brazing process, for example, first porous region 300A and second porous region 300B with braze material 310 therein have at least one different physical characteristic. Where variable porosity region 300D is present, it has perhaps different physical characteristic(s) than first and second porous regions 300A, 300B. Hence, as a result of the brazing process, first porous region 300A and second porous region 300B (and perhaps variable porous region 300D) with braze material 310 therein in component 202 have at least one different physical characteristic. For example, more braze material 310 may result in a stronger joint adhesive bond strength, higher ductility, higher thermal or electrical conductivity and/or higher oxidation resistance, and less braze material 310 may result in less surface roughness, less hardness, lower joint adhesive bond strength, lower ductility, lower thermal or electrical conductivity and/or lower oxidation resistance. In any event, controlling the amount of braze material and the porosity of the different porous regions allows controlling physical characteristics of the final product. In one example, the first member porosity of first porous region 300A may be higher (i.e., less dense) than the second member porosity of second porous region 300B. In this case, infiltrating includes infiltrating first porous region 300A with more braze material 310 than second porous region 300B. Depending on the braze material 310 used, among other factors, the different porosities allow for customization of at least one physical characteristic of component 202, such as: joint adhesive bond strength, stress/strain resistance, ductility, wear resistance, oxidation resistance, thermal conductivity, electrical conductivity, surface roughness, hardness, and/or mass. In addition, the multi-flow paths for braze material 310 using porous regions 300 may decrease the likelihood of a lack of fill and/or voids along a brazed joint compared to the conventional narrow gap-filling brazing process, due to tight manufacturing tolerances required for narrow gap brazing. Hence, component 202 may be at least 98% solid despite the use of metal coupon 200 with porous region(s) 300 therein. The one or more porosities of TT structures 340 can also be used to customize the physical characteristics of those structures.

In certain embodiments, different braze materials 310 may be used in different parts of metal coupon(s) 200, providing further customization of the coupling of metal coupon(s) 200 in component 202 and physical characteristics of regions of component 202. For example, referring to FIG. 9C, a first braze material 310A may be used on a first part or side 326 of component 202 and another braze material 310B, different than first braze material 310A, may be used on a different part or side 328 of component 202. In one example, referring to FIGS. 3, 4 and 9C, first part or side 326 of component 202 may be a first (concave, pressure) side outer wall 152, 178 of airfoil 150, 176 and second or side 328 of component 202 may be a second (convex, suction) side outer wall 154, 178 of an airfoil 150, 176. The different braze materials 310A, 310B, in addition to different porous regions 300, on the different part or sides 326, 328 can be customized for the anticipated environment of component 202 at those locations. As will be recognized, the variations of braze materials and/or porous regions possible to address different situations are immense.

Other embodiments of a method according to the disclosure may include just forming metal coupon 200 for repairing component 202. In this case, as shown in FIG. 8A, the method includes creating a model of coupon opening 204 in body 206 of component 202, and additively manufacturing metal coupon 200 to at least closely fit coupon opening 204, e.g., with a near net shape of coupon opening 204. As described herein and shown in FIGS. 7B-D, metal coupon 200 may include at least first porous region 300A having a first member porosity and second porous region 300B having a second member porosity different than the first member porosity. The different first and second porosities create different physical characteristics after coupling of metal coupon 200 in coupon opening 204 using braze material(s) 310. In addition, metal coupon 200 may include any version of TT structure(s) 340 described herein.

FIG. 8F shows illustrative optional finishing steps for component 202, such as but not limited to machining to smooth exterior surfaces and remove excess braze material. As noted, the teachings of the disclosure may remove the need for other finishing steps typically used to address residual stresses present in the material post additive manufacturing, e.g., peening, heat treatment, and/or hot isostatic pressing (HIP), among others.

Figure 9A:
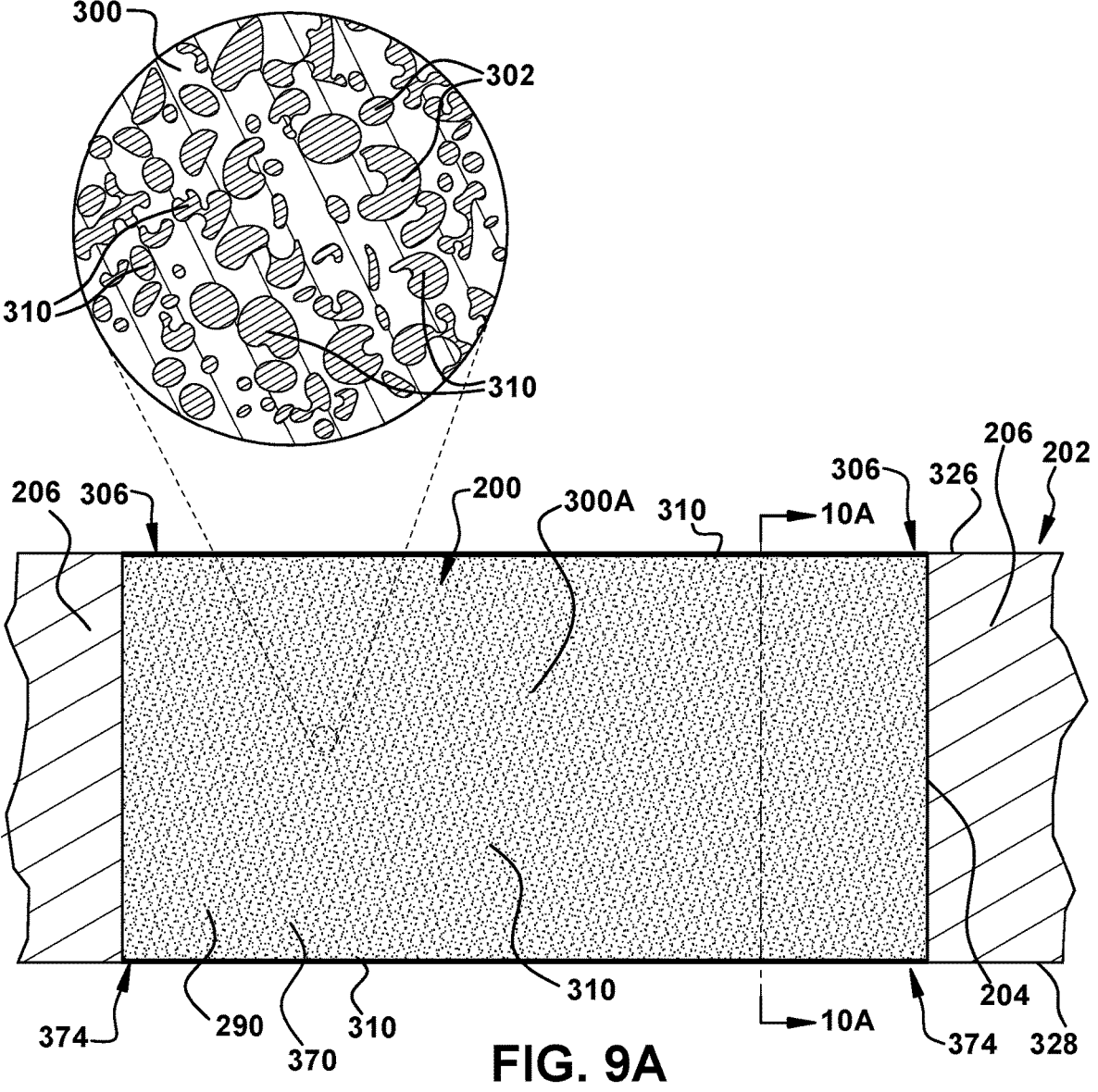
FIGS. 9A-C show enlarged cross-sectional views of a metal coupon in a coupon opening in a body of a component according to embodiments of the disclosure.
Figure 9B:
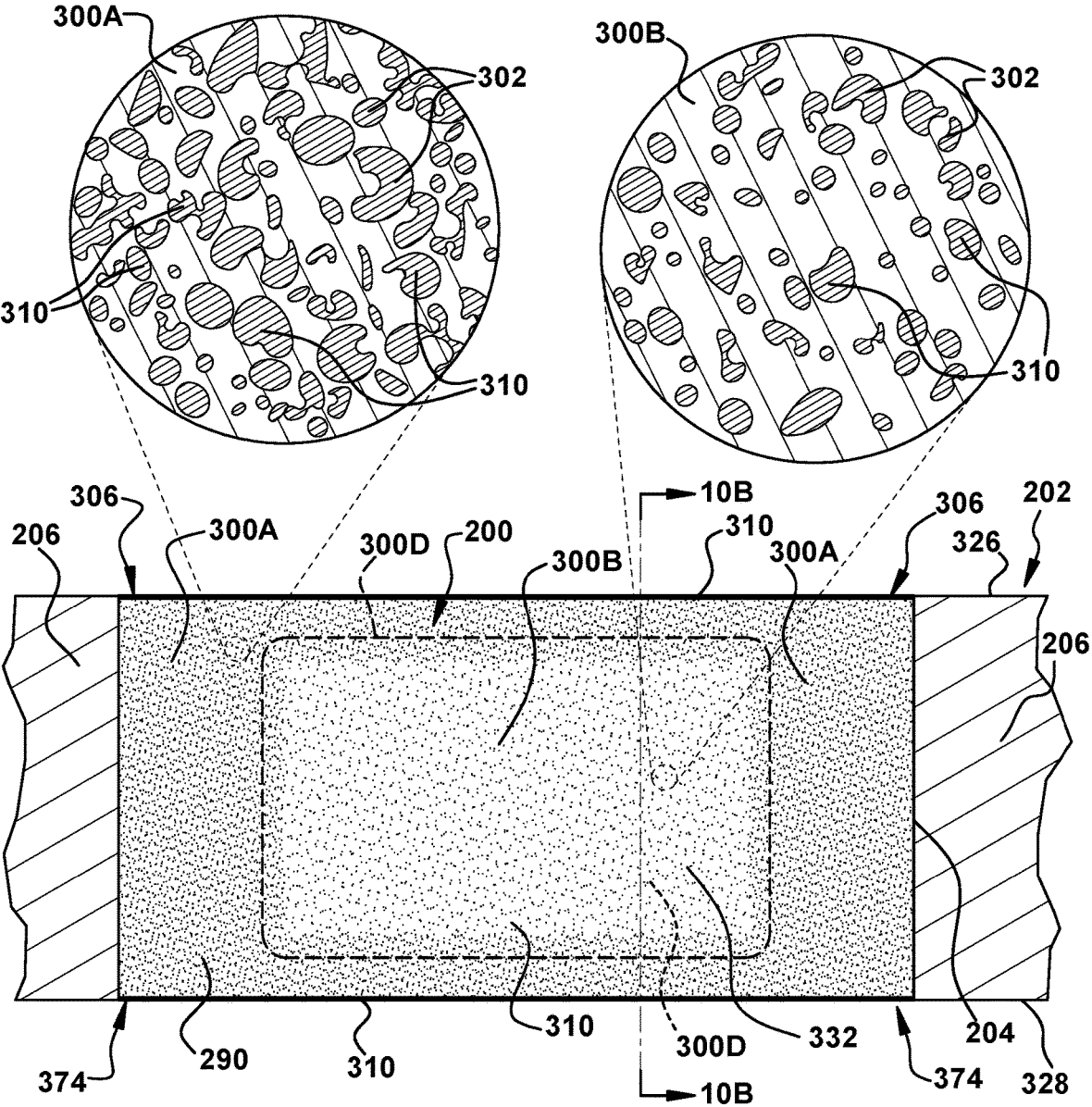
Figure 9C:
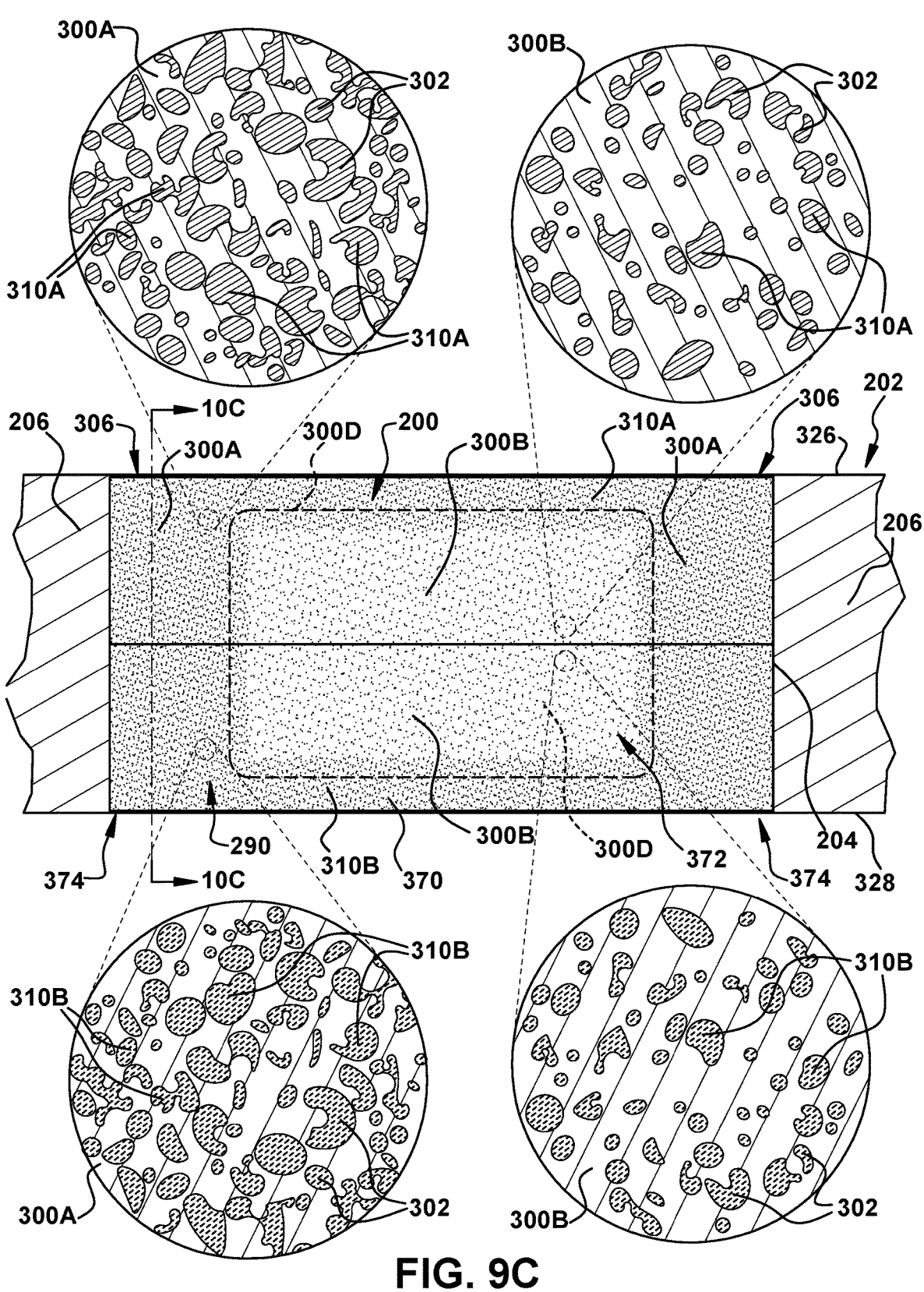

FIGS. 3, 4 and 9A-C show embodiments of component 202 according to embodiments of the disclosure with FIGS. 9A-C showing enlarged cross-sectional views of metal coupon 200 in coupon opening 204 of body 206 of component 202. FIG. 9A shows component 202 with metal coupon 200 with a single porous region 300 in primary member 290, FIG. 9B shows component 202 with metal coupon 200 having two or more porous regions 300A, 300B in primary member 290, and FIG. 9C shows component 202 with metal coupon 200 having two or more porous regions 300A, 300B and different braze materials 310A, 310B in primary member 290. Component 202 includes body 206. As noted herein, body 206 can have any form for the particular industrial application in which component 202 is used. In the examples used herein, body 206 may include a turbine rotating blade 132 (FIG. 3) or a turbine stationary nozzle 126 (FIG. 4). While metal coupon 200 is shown in, for example, airfoil 150, 176 of blade 132 and nozzle 126 in FIGS. 3 and 4, respectively, metal coupon 200 can be in any part of body 206 of component 202. Additively manufactured (AM) metal coupon 200 has at least first porous region 300A in primary member 290 having a first member porosity, as described herein relative to FIG. 7A. Braze material 310 couples metal coupon 200 in coupon opening 204 in body 206. As shown in FIG. 9A, braze material 310 includes a first section 370 infiltrated into first porous region 300A based at least on a characteristic of the first member porosity. As shown in FIG. 9B, metal coupon 200 further includes second porous region 300B having a second member porosity different than the first member porosity. The first member porosity may be different from the second member porosity in terms of at least one of the following characteristics: percentage of open space volume to total volume, pore shape, pore size, number of pores, and/or pore connecting passages. Body 206 may have a body porosity different than one or both of first and second member porosities and any TT structure porosity. For example, body 206 may have a body porosity denser than both first and second member porosities and any TT structure porosity, e.g., it can be 100% solid. Optionally, metal coupon 200 may include a variable porosity region 300D (shown by dashed boxes in FIG. 9B) between (and possibly including part of) first porous region 300A and second porous region 300B. The variable porosity region 300D may gradually change porosity between first and second member porosities, e.g., in a stepped or incremental manner.

In FIG. 9C, braze material 310B includes a second section 372 infiltrated into second porous region 300B based at least on a characteristic of the second member porosity. "At least on a characteristic" of the porosity indicates the porosity can result in different infiltration characteristics, such as braze material volume, pattern within the porosity, crystallization, and/or other characteristics. However, as understood in the art, other factors can also impact the infiltration characteristics such as the type of braze material and characteristics of the brazing process such as but not limited to: temperature, pressure, and/or positioning of component 202 and metal coupon 200. The consequence of the different porosities is that first porous region 300A and second porous region 300B with braze material(s) 310 therein have at least one different physical characteristic. The porosities can be customized to select those physical characteristics inasmuch as the porosities can impact those physical characteristics. In one example, the first member porosity of first porous region 300A may be higher (i.e., less dense) than the second member porosity of second porous region 300B, and first porous region 300A includes more braze material 310 therein than second porous region 300B. In another example, first porous region 300A is adjacent to at least part of edge 306 of metal coupon 200 configured for joining to body 206. Also, second porous region 300B may be adjacent to first porous region 300A. Alternatively, second porous region 300B may also be adjacent at least (another) part of edge 306 of metal coupon 200, and perhaps adjacent first porous region 300A. This arrangement, as shown in FIG. 9B, may be advantageous to place more braze material 310 near a braze joint 374 to strengthen the joint adhesive bond strength of metal coupon 200 in coupon opening 204 in body 206, or it may allow for less oxidation at braze joint 374 or greater thermal conductivity at braze joint 374. Any of the physical characteristics described herein can also be customized based on the different porosities and/or different braze materials. As noted, depending on the braze material 310 used, different porosities may allow for customization of physical characteristic(s) of component 202, such as: joint adhesive bond strength, stress/strain resistance, ductility, wear resistance, oxidation resistance, thermal conductivity, electrical conductivity, surface roughness, hardness, and/or mass. As noted, metal coupon 200 may have a near net shape of coupon opening 204 in body 206 of component 202. As shown in, for example, FIGS. 7A and 8C, metal coupon 200 may optionally include cooling passage(s) 360 therein. Cooling passage(s) 360 are defined in metal coupon 200 and may extend through exterior surface 308 of the metal coupon.

While particular locations of different porous regions 300 in primary member 290 have been illustrated herein, it is emphasized that the different porous regions can be arranged in any manner to provide different braze material infiltration characteristics and different physical characteristics for component 202.

Figure 10A:
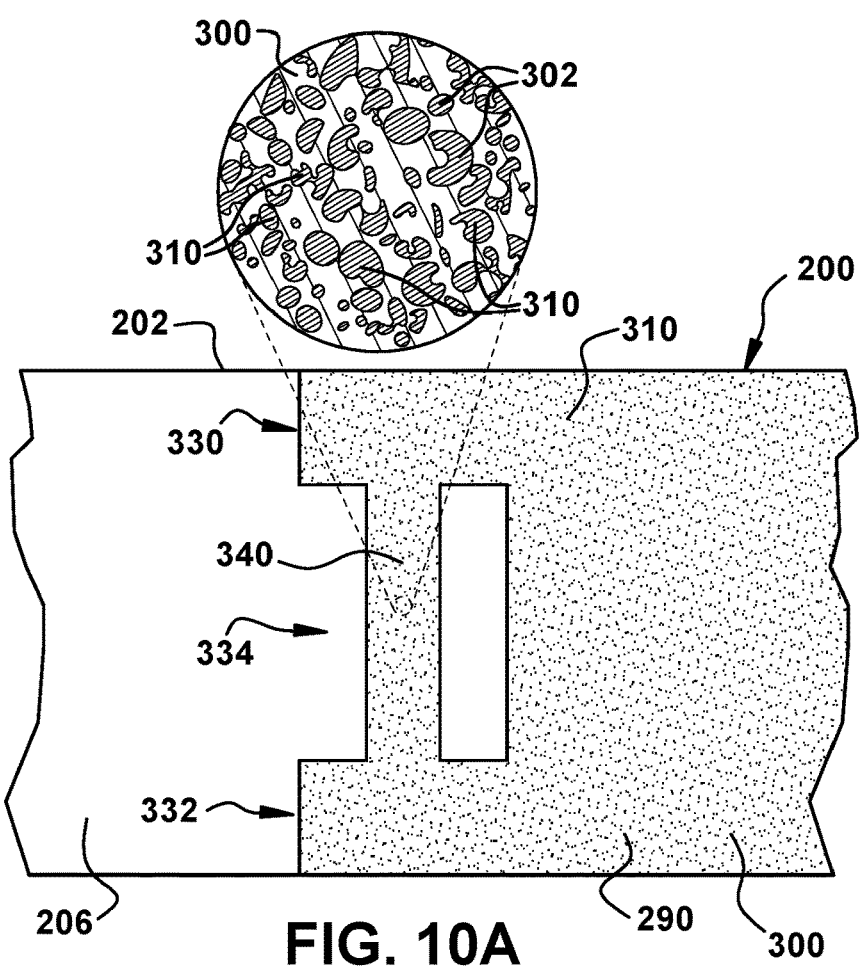
FIGS. 10A-E show enlarged cross-sectional views of a metal coupon and thermal transfer structure(s) in a coupon opening in a body of a component according to embodiments of the disclosure.
Figure 10B:
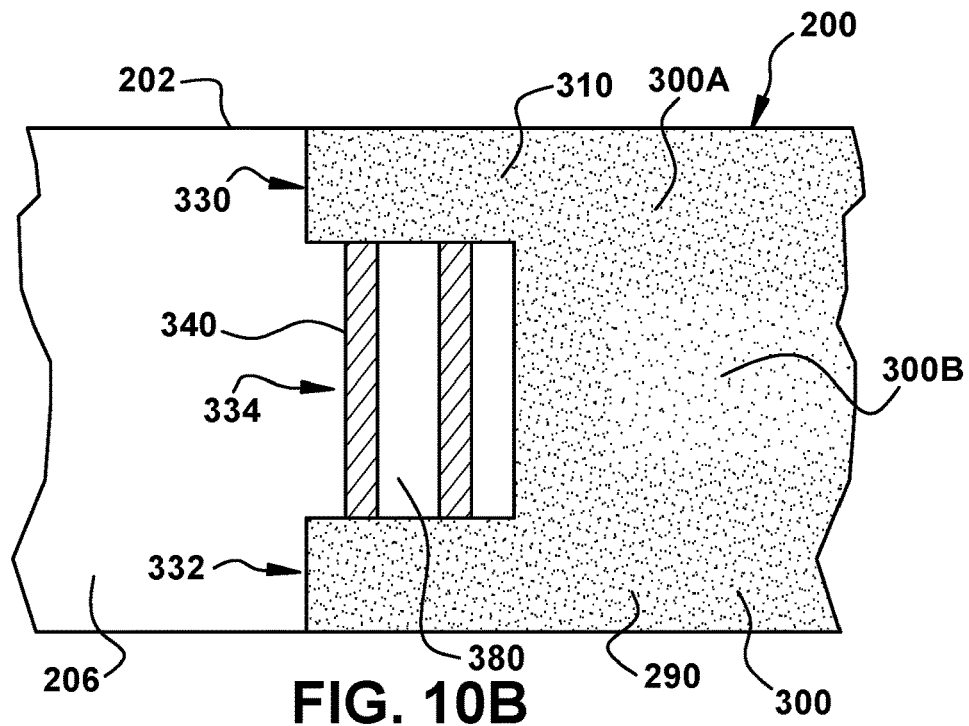
Figures 10C, 10D:
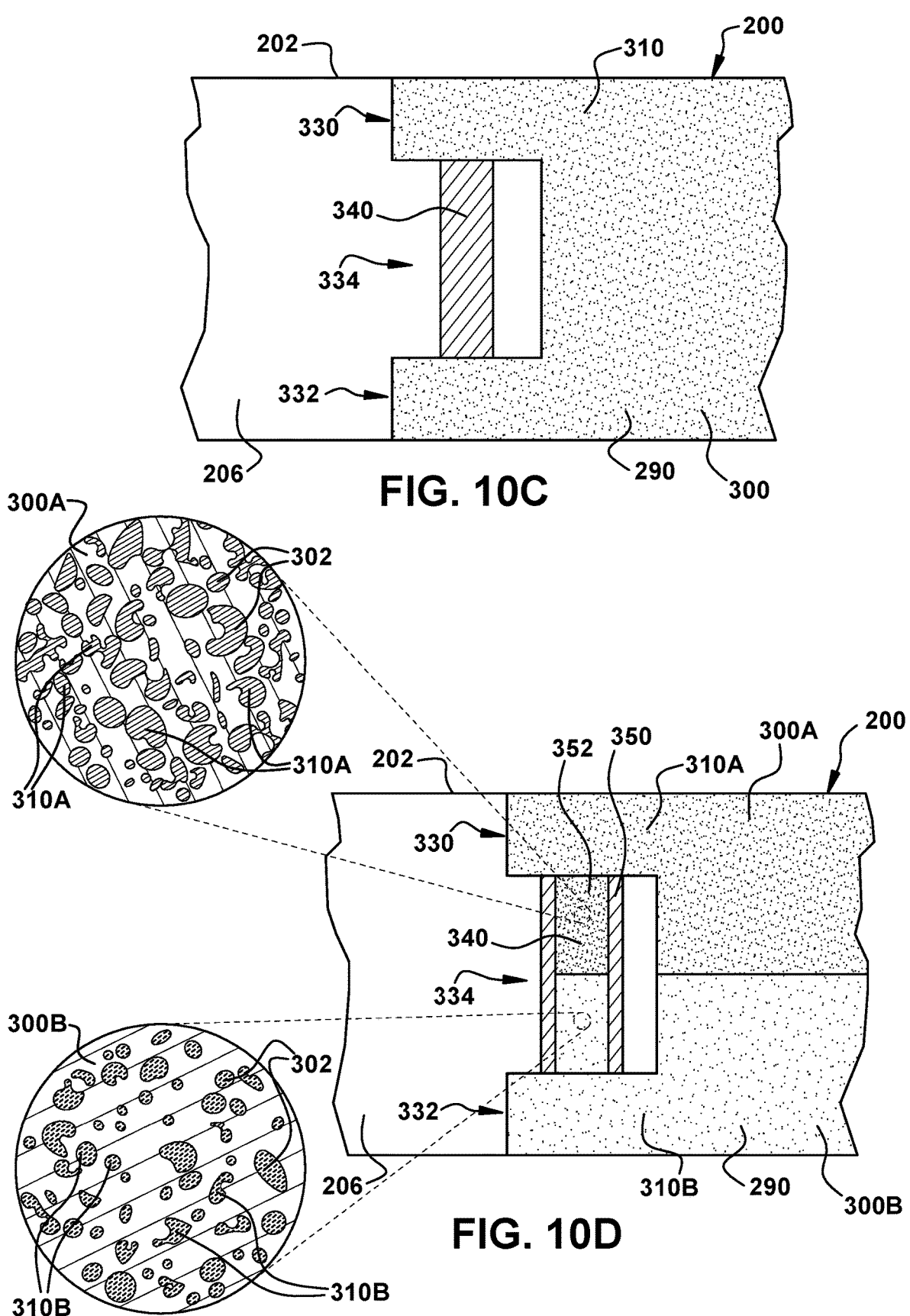
Figure 10E:
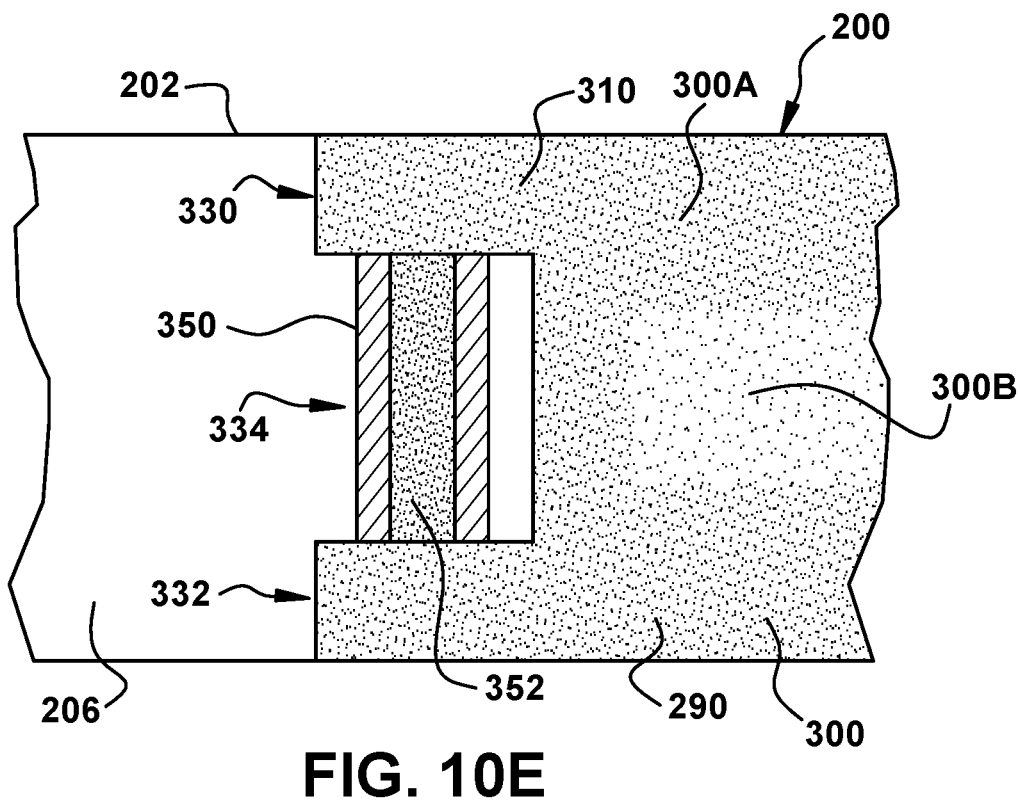

FIGS. 10A-E show cross-sectional views from FIGS. 9A-C illustrating example embodiments of metal coupons 200 with TT structure(s) 340 in component 202. FIGS. 10A and 10D show cross-sectional views along view line 10A-10A in FIG. 9A but with different TT structures 340; FIGS. 10B and 10E show cross-sectional views along view line 10B-10B in FIG. 9B but with different TT structures 340; and FIG. 10C shows a cross-sectional view along view line 10C-10C in FIG. 9C. It will be recognized that while FIGS. 10A-E show single TT structures 340, more than one may be used in any of the settings illustrated. FIG. 10A shows TT structure(s) 340 that have the same porosity as porous region 300 of primary member 290, like in FIG. 7A. Braze material 310 infiltrates TT structure(s) 340. FIG. 10B shows metal coupon 200 in component 202 with TT structure(s) 340 with a hollow center 380, like in FIG. 7M. FIG. 10C shows metal coupon 200 in component 202 with TT structure(s) 340 that are solid, like in for example FIG. 7G. FIG. 10D shows metal coupon 200 in component 202 with TT structure(s)

340 that are porous (same porosity as primary member 290 or different (like FIGS. 7A, 7C-D, 7J, 7N)) and has two different braze materials 310A, 310B infiltrating the TT structures, like in FIG. 9C. Braze materials 310A-B can infiltrate TT structure(s) 340 from first portion 330 and/or second portion 332 of primary member 290. FIG. 10E shows metal coupon 200 in component 202 with TT structure(s) 340 that are porous and include barrier 350 with porous center 352, like in FIG. 7J. Braze material(s) 310 may infiltrate TT structure(s) 340 from first portion 330 and/or second portion 332 of primary member 290.

While certain example combinations of TT structure(s) 340 and primary member 290 arrangements have been shown in the drawings, e.g., FIGS. 10A-E, it is emphasized that all of the various arrangements described herein are interchangeable and can be used together. Accordingly, while every different combination is not expressly illustrated, it will be understood that all of the various arrangements of TT structure(s) 340 and porous regions of primary member 290 can be used together in any manner.

Embodiments of the disclosure may also include, as shown in FIGS. 1-2, turbomachine 100 including turbine assembly 110, and at least one component 202, as described herein. Component(s) 202 may take the form turbine stationary nozzle(s) 126, turbine rotating blade(s) 132 or other components of turbomachine 100. Metal coupon 200 can be used in a newly manufactured component or in a repaired component.

The disclosure provides various technical and commercial advantages, examples of which are discussed herein. For repairs, additive manufacturing allows cost-effective creation of metal coupons with custom-fitted shapes where only damaged material needs to be removed. Porous region(s) may provide a higher percentage of a base metal alloy (e.g., >60%) in certain areas that may result in improved physical characteristics compared to, e.g., pre-sintered preforms. Porous regions may also provide a welded/fused particle matrix (e.g., with a superalloy metal base) with braze material fill which is stronger compared to conventional metal particles surrounded by braze material. Multi-flow paths for the braze material using porous regions may also decrease the likelihood of a lack of fill and/or voids along a brazed joint compared to the conventional narrow gap-filling brazing process. Porous regions can be formed with differences in porosity across metal coupon to allow for highly customized braze material flow. Porous regions also accommodate greater joint gap dimensional variance compared to machined solid coupons with narrow gaps for braze material. Repairs using the teachings of the disclosure are stronger than the ones using traditional narrow gap brazing processes, and do not require certain post-repair finishing, yet provide improved physical characteristics compared to conventional techniques, such as pre-sintered preforms (PSPs). The thermal transfer structure(s) exhibit enhanced heat rejection, reduce weight of the component, and may improve component vibratory response.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged;

such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/–10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. An additively manufactured (AM) metal coupon for insertion in a component, the AM metal coupon comprising:
   a primary member having a member porosity between 2% to 50% open space volume to total volume of the primary member, wherein the primary member has a first portion distanced from a second portion by a gap; and
   at least one thermal transfer structure extending between the first portion and the second portion across the gap, wherein the at least one thermal transfer structure includes at least one of a pin or a fin extending between the first portion and the second portion across the gap, and wherein the at least one thermal transfer structure has a hollow center.

2. The metal coupon of claim 1, wherein the at least one thermal transfer structure includes a plurality of the at least one of the pin or the fin extending between the first portion and the second portion across the gap.

3. The metal coupon of claim 1, wherein the at least one thermal transfer structure has the member porosity.

4. The metal coupon of claim 1, wherein the at least one thermal transfer structure has a thermal transfer (TT) structure porosity different than the member porosity, wherein the TT structure porosity is between 2% to 50% open space volume to total volume of the at least one thermal transfer structure.

5. The metal coupon of claim 1, further comprising a cooling passage extending through at least part of the primary member and having a first end open to the gap and a second end extending through an exterior surface of the primary member.

6. A component, comprising:
   a body;
   an additively manufactured (AM) metal coupon including:
      a primary member having a member porosity between 2% to 50% open space volume to total volume of the primary member, wherein the primary member has a first portion distanced from a second portion by a gap; and
      at least one thermal transfer structure extending between the first portion and the second portion across the gap, wherein the at least one thermal transfer structure includes at least one of a pin or a fin extending between the first portion and the second portion across the gap, and wherein the at least one thermal transfer structure has a hollow center; and
   a braze material coupling the AM metal coupon in a coupon opening in the body, the braze material infiltrated into the primary member based at least on a characteristic of the member porosity.

7. The component of claim 6, wherein the at least one thermal transfer structure includes a plurality of the at least one of the pin or the fin extending between the first portion and the second portion across the gap.

8. The component of claim 6, wherein the at least one thermal transfer structure has the member porosity, wherein the braze material infiltrates at least partially into the at least one thermal transfer structure.

9. The component of claim 6, wherein the at least one thermal transfer structure has a thermal transfer (TT) structure porosity different than the member porosity.

10. The component of claim 9, wherein the TT structure porosity is between 2% to 50% open space volume to total volume of the at least one thermal transfer structure, wherein the braze material infiltrates at least partially into the at least one thermal transfer structure based at least on a characteristic of the TT structure porosity.

11. The component of claim 10, further comprising a braze material infiltration barrier encapsulating a side of the at least one thermal transfer structure.

12. The component of claim 6, further comprising a cooling passage extending through at least part of the primary member and having a first end open to the gap and a second end extending through an exterior surface of the primary member.

* * * * *